US012683779B2

(12) United States Patent
Yang et al.

(10) Patent No.: US 12,683,779 B2
(45) Date of Patent: Jul. 14, 2026

(54) SECURE DISTRIBUTED COMPUTING SYSTEM AND COMPUTING METHOD

(71) Applicant: RAKUTEN GROUP, INC., Tokyo (JP)

(72) Inventors: Bin Yang, Tokyo (JP); Young Joo Chung, San Mateo, CA (US)

(73) Assignee: RAKUTEN GROUP, INC., Tokyo (JP)

( * ) Notice: Subject to any disclaimer, the term of this patent is extended or adjusted under 35 U.S.C. 154(b) by 593 days.

(21) Appl. No.: 18/140,628

(22) Filed: Apr. 28, 2023

(65) Prior Publication Data

US 2024/0364511 A1     Oct. 31, 2024

(51) Int. Cl.
　　 *H04L 9/08* 　　　　 (2006.01)
　　 *H04L 9/00* 　　　　 (2022.01)
(52) U.S. Cl.
　　 CPC ............ *H04L 9/0894* (2013.01); *H04L 9/006* (2013.01); *H04L 9/0869* (2013.01)
(58) Field of Classification Search
　　 CPC ..... H04L 9/0894; H04L 9/006; H04L 9/0869; H04L 9/085; H04L 63/0823; G06F 21/33; H04W 12/069
　　 See application file for complete search history.

(56) References Cited

U.S. PATENT DOCUMENTS

| | | | | |
|---|---|---|---|---|
| 11,811,920 B1 * | 11/2023 | Zhao | ..................... | H04L 9/0841 |
| 2018/0373834 A1 * | 12/2018 | Cho | ........................ | G16B 50/30 |
| 2021/0174243 A1 * | 6/2021 | Angel | ..................... | H04L 9/083 |
| 2021/0359846 A1 * | 11/2021 | Wright | ................ | G06F 16/2379 |
| 2023/0237321 A1 * | 7/2023 | Cirillo | .................. | G06N 3/0895 |
| | | | | 706/15 |
| 2024/0039692 A1 * | 2/2024 | Xu | ........................... | H04L 9/008 |
| 2024/0330742 A1 * | 10/2024 | Hunn | ..................... | G06N 20/00 |
| 2024/0346367 A1 * | 10/2024 | Nandi | .................... | G06N 3/098 |

OTHER PUBLICATIONS

Chuan Ma et al., Trusted AI in Multiagent Systems: An Overview of Privacy and Security for Distributed Learning, Dec. 2022, pp. 1-36 (Year: 2022).*

(Continued)

*Primary Examiner* — Luu T Pham
*Assistant Examiner* — Canh Le
(74) *Attorney, Agent, or Firm* — HEA Law PLLC

(57) ABSTRACT

Provided is a computing system including: a first device configured to securely manage first secret information and first permutation information; and a second device configured to securely manage second secret information and second permutation information, and wherein first managed information that is managed by the first device from among first permutation results obtained as a result of permutating the first secret information, second managed information that is managed by the first device from among second permutation results obtained as a result of permutating the second secret information, third managed information that is managed by the second device from among the first permutation results, and fourth managed information that is managed by the second device from among the second permutation results are used to compute a secret product being a product of the first secret information and the second secret information.

20 Claims, 13 Drawing Sheets

(56)     References Cited

OTHER PUBLICATIONS

Yang Yang et al., "A Comprehensive Survey on Secure Outsourced Computation and Its Applications," September , 2019, pp. 1-40 (Year: 2019).*
Qinbin Li, et al., "A Survey on Federated Learning Systems: Vision, Hype and Reality for Data Privacy and Protection", published on Jul. 23, 2019, Internet, https://arxiv.org/abs/1907.09693.

* cited by examiner

FIG.2

Definition

- Feature (n x m): $X$ $(x_1, x_2, x_3)$
- Label (n x 1): $y$
- Prediction: $\hat{y}_i = w_1 y_{1i} + w_2 y_{2i} + w_3 y_{3i} + w_0$
- Loss (L2): $L = \Sigma_i (y_i - \hat{y}_i)^2$ Derivation (SGD)

- $\frac{\partial L}{\partial w_k} = \frac{\partial L}{\partial \hat{y}} \frac{\partial \hat{y}}{\partial w_k} = 2 \, \Sigma_i (\hat{y}_i - y_i) \frac{\partial \hat{y}_i}{\partial w_k} = 2 \, \Sigma_i (\hat{y}_i - y_i) y_{ki}$ $= 2(\Sigma_i w_1 y_{1i} y_{1i} + \Sigma_i w_2 y_{2i} y_{1i} + \Sigma_i w_3 y_{3i} y_{1i} + \Sigma_i (w_0 - y_i) y_{1i})$

- $\frac{\partial L}{\partial w_0} = \frac{\partial L}{\partial \hat{y}} \frac{\partial \hat{y}}{\partial w_0} = 2 \, \Sigma_i (\hat{y}_i - y_i) \frac{\partial \hat{y}_i}{\partial w_0} = 2 \, \Sigma_i (\hat{y}_i - y_i)$ $= 2(\Sigma_i w_1 y_{1i} + \Sigma_i w_2 y_{2i} + \Sigma_i w_3 y_{3i} + \Sigma_i (w_0 - y_i))$

- $\frac{\partial L}{\partial v} = \frac{\partial L}{\partial \hat{y}} \frac{\partial \hat{y}}{\partial v} = 2 \, \Sigma_i (\hat{y}_i - y_i) \frac{\partial \hat{y}_i}{\partial y_{ki}} \frac{\partial y_{ki}}{\partial v} = 2 \, \Sigma_i (\hat{y}_i - y_i) w_k \frac{\partial y_{ki}}{\partial v}$ $= 2 \left( \Sigma_i w_1 y_{1i} w_1 \frac{\partial y_{1i}}{\partial v} + \Sigma_i w_2 y_{2i} w_1 \frac{\partial y_{1i}}{\partial v} + \Sigma_i w_3 y_{3i} w_1 \frac{\partial y_{1i}}{\partial v} - \Sigma_i (w_0 - y_i) w_1 \frac{\partial y_{1i}}{\partial v} \right)$

C1

|  | A | B |
|---|---|---|
| Input | $a = (a_1, \cdots, a_n)$ | $b = (b_1, \cdots, b_n)$ |
| Output |  | $a \cdot b = \sum_{i=1}^{n} a_i b_i$ |
| E.g, | $a_i = w_2 y_{2i}$ | $b_i = w_1 \dfrac{\partial y_{1i}}{\partial v}$ |

Right Protocol      C2

|  | A | B |
|---|---|---|
| Input | $a$ | $b$ |
| Output |  | $a \cdot b$ |

Notation: $a \cdot b = a^{\mathrm{T}} b = \langle a, b \rangle = \sum_i a_i b_i$ Left Protocol      C3

|  | A | B |
|---|---|---|
| Input | $a$ | $b$ |
| Output | $a \cdot b$ |  |

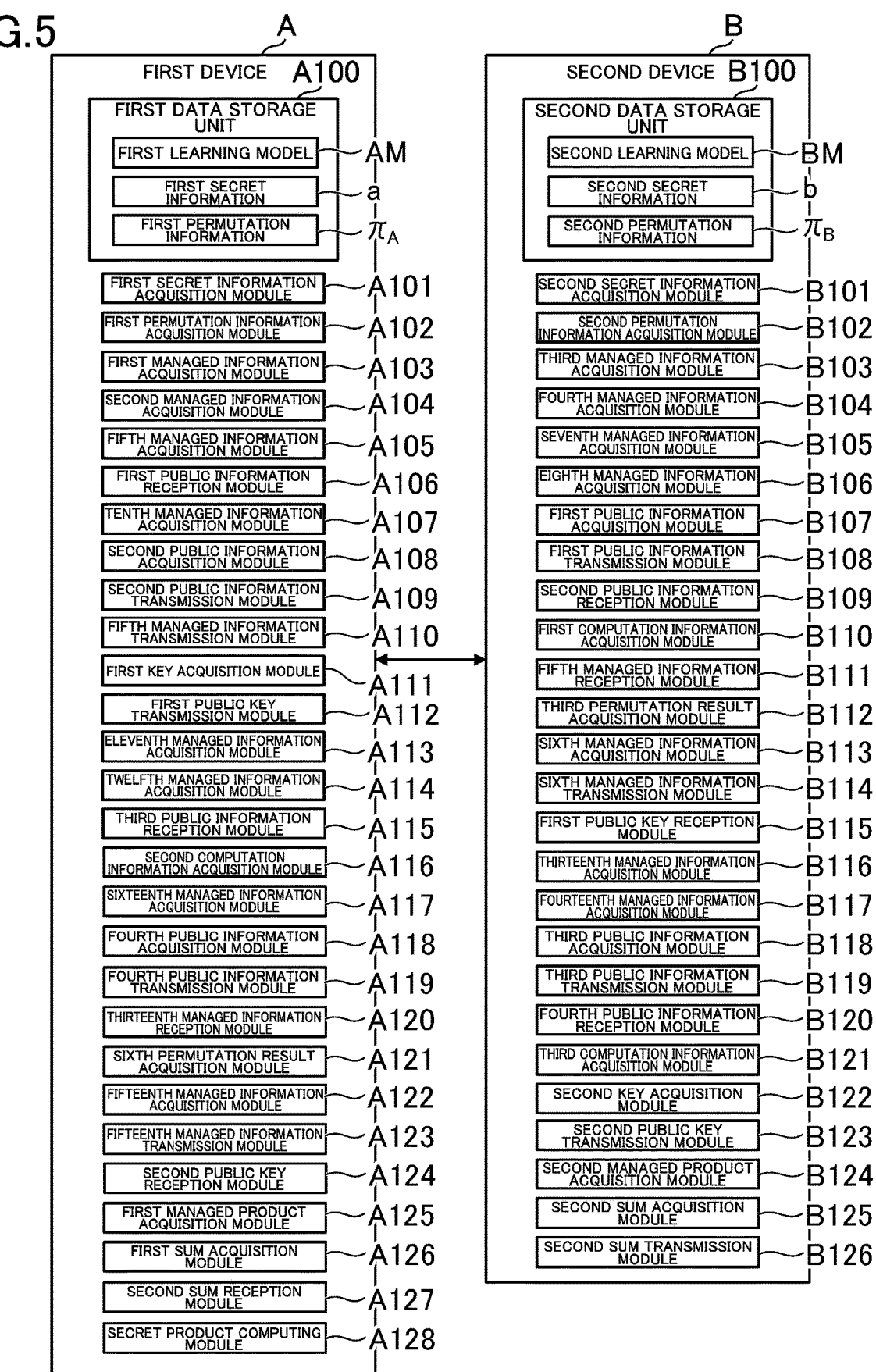

FIRST DEVICE A100

FIRST DATA STORAGE UNIT

| FIRST LEARNING MODEL | AM |
| FIRST SECRET INFORMATION | a |
| FIRST PERMUTATION INFORMATION | $\pi_A$ |

FIRST SECRET INFORMATION ACQUISITION MODULE — A101

FIRST PERMUTATION INFORMATION ACQUISITION MODULE — A102

FIRST MANAGED INFORMATION ACQUISITION MODULE — A103

SECOND MANAGED INFORMATION ACQUISITION MODULE — A104

FIFTH MANAGED INFORMATION ACQUISITION MODULE — A105

FIRST PUBLIC INFORMATION RECEPTION MODULE — A106

TENTH MANAGED INFORMATION ACQUISITION MODULE — A107

SECOND PUBLIC INFORMATION ACQUISITION MODULE — A108

SECOND PUBLIC INFORMATION TRANSMISSION MODULE — A109

FIFTH MANAGED INFORMATION TRANSMISSION MODULE — A110

FIRST KEY ACQUISITION MODULE — A111

FIRST PUBLIC KEY TRANSMISSION MODULE — A112

ELEVENTH MANAGED INFORMATION ACQUISITION MODULE — A113

TWELFTH MANAGED INFORMATION ACQUISITION MODULE — A114

THIRD PUBLIC INFORMATION RECEPTION MODULE — A115

SECOND COMPUTATION INFORMATION ACQUISITION MODULE — A116

SIXTEENTH MANAGED INFORMATION ACQUISITION MODULE — A117

FOURTH PUBLIC INFORMATION ACQUISITION MODULE — A118

FOURTH PUBLIC INFORMATION TRANSMISSION MODULE — A119

THIRTEENTH MANAGED INFORMATION RECEPTION MODULE — A120

SIXTH PERMUTATION RESULT ACQUISITION MODULE — A121

FIFTEENTH MANAGED INFORMATION ACQUISITION MODULE — A122

FIFTEENTH MANAGED INFORMATION TRANSMISSION MODULE — A123

SECOND PUBLIC KEY RECEPTION MODULE — A124

FIRST MANAGED PRODUCT ACQUISITION MODULE — A125

FIRST SUM ACQUISITION MODULE — A126

SECOND SUM RECEPTION MODULE — A127

SECRET PRODUCT COMPUTING MODULE — A128

SECOND DEVICE B100

SECOND DATA STORAGE UNIT

| SECOND LEARNING MODEL | BM |
| SECOND SECRET INFORMATION | b |
| SECOND PERMUTATION INFORMATION | $\pi_B$ |

SECOND SECRET INFORMATION ACQUISITION MODULE — B101

SECOND PERMUTATION INFORMATION ACQUISITION MODULE — B102

THIRD MANAGED INFORMATION ACQUISITION MODULE — B103

FOURTH MANAGED INFORMATION ACQUISITION MODULE — B104

SEVENTH MANAGED INFORMATION ACQUISITION MODULE — B105

EIGHTH MANAGED INFORMATION ACQUISITION MODULE — B106

FIRST PUBLIC INFORMATION ACQUISITION MODULE — B107

FIRST PUBLIC INFORMATION TRANSMISSION MODULE — B108

SECOND PUBLIC INFORMATION RECEPTION MODULE — B109

FIRST COMPUTATION INFORMATION ACQUISITION MODULE — B110

FIFTH MANAGED INFORMATION RECEPTION MODULE — B111

THIRD PERMUTATION RESULT ACQUISITION MODULE — B112

SIXTH MANAGED INFORMATION ACQUISITION MODULE — B113

SIXTH MANAGED INFORMATION TRANSMISSION MODULE — B114

FIRST PUBLIC KEY RECEPTION MODULE — B115

THIRTEENTH MANAGED INFORMATION ACQUISITION MODULE — B116

FOURTEENTH MANAGED INFORMATION ACQUISITION MODULE — B117

THIRD PUBLIC INFORMATION ACQUISITION MODULE — B118

THIRD PUBLIC INFORMATION TRANSMISSION MODULE — B119

FOURTH PUBLIC INFORMATION RECEPTION MODULE — B120

THIRD COMPUTATION INFORMATION ACQUISITION MODULE — B121

SECOND KEY ACQUISITION MODULE — B122

SECOND PUBLIC KEY TRANSMISSION MODULE — B123

SECOND MANAGED PRODUCT ACQUISITION MODULE — B124

SECOND SUM ACQUISITION MODULE — B125

SECOND SUM TRANSMISSION MODULE — B126

FIG.8
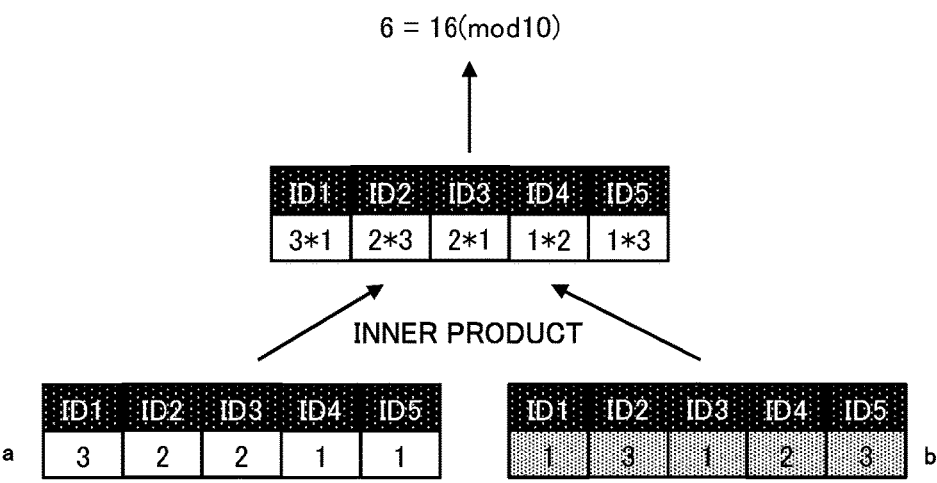
$6 = 16(\text{mod}10)$
| ID1 | ID2 | ID3 | ID4 | ID5 |
|-----|-----|-----|-----|-----|
| 3*1 | 2*3 | 2*1 | 1*2 | 1*3 |
INNER PRODUCT
| | ID1 | ID2 | ID3 | ID4 | ID5 |
|---|-----|-----|-----|-----|-----|
| a | 3 | 2 | 2 | 1 | 1 |
| ID1 | ID2 | ID3 | ID4 | ID5 | |
|-----|-----|-----|-----|-----|---|
| 1 | 3 | 1 | 2 | 3 | b |
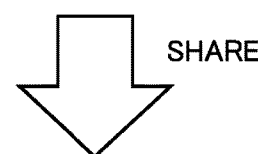
SHARE
| $\pi_B \pi_A$ | ID2 | ID1 | ID5 | ID3 | ID4 |
|---|-----|-----|-----|-----|-----|
| $\langle \pi_B(\pi_A(a)) \rangle_A$ | 9 | 5 | 4 | 6 | 2 |
| $\langle \pi_B(\pi_A(b)) \rangle_A$ | 6 | 1 | 0 | 8 | 8 |
| ID2 | ID1 | ID5 | ID3 | ID4 | $\pi_B \pi_A$ |
|-----|-----|-----|-----|-----|---|
| 3 | 8 | 7 | 6 | 9 | $\langle \pi_B(\pi_A(a)) \rangle_B$ |
| 7 | 0 | 3 | 3 | 4 | $\langle \pi_B(\pi_A(b)) \rangle_B$ |

FIG.11

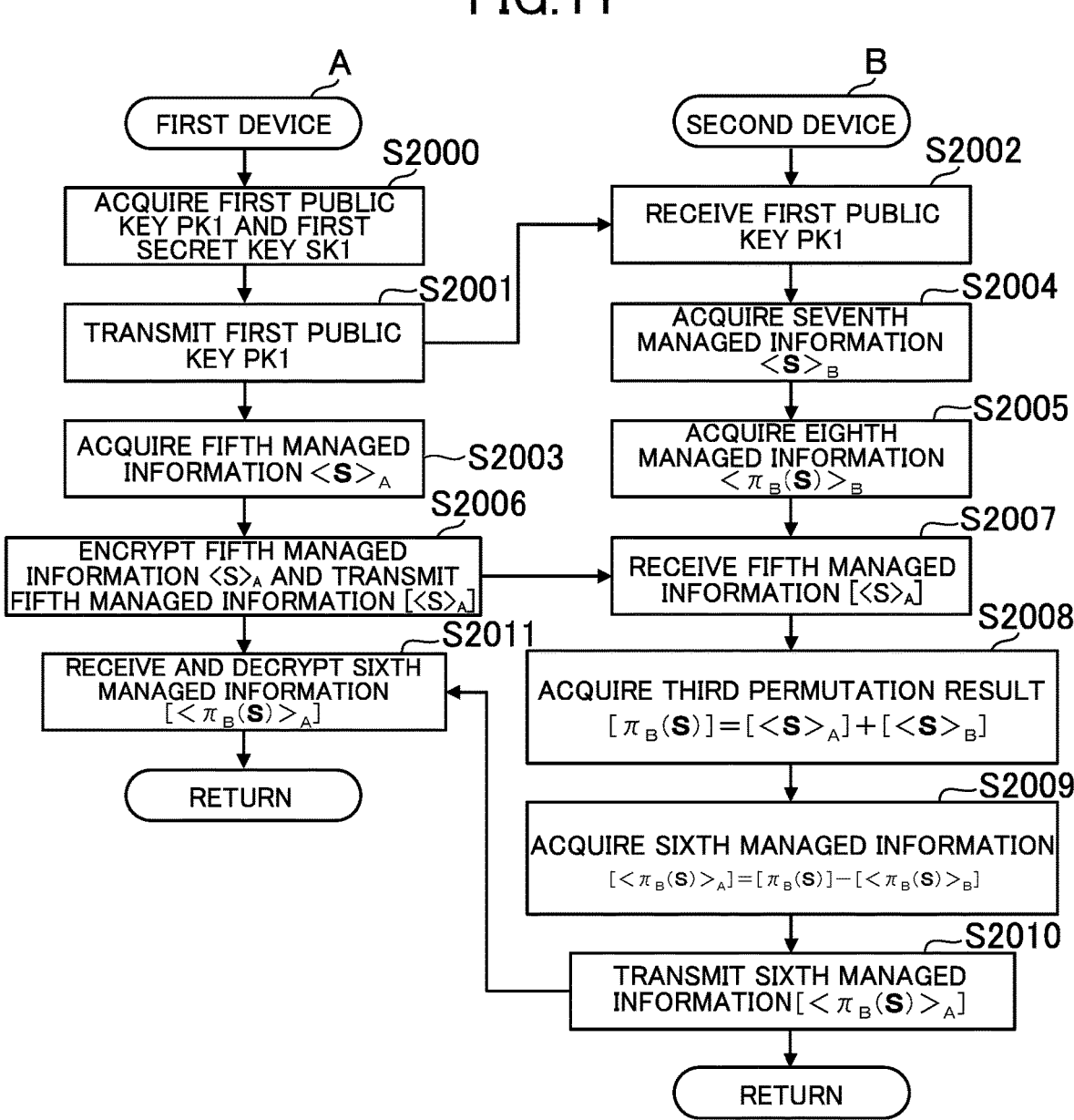

A

FIRST DEVICE

S2000

ACQUIRE FIRST PUBLIC KEY PK1 AND FIRST SECRET KEY SK1

S2001

TRANSMIT FIRST PUBLIC KEY PK1

ACQUIRE FIFTH MANAGED INFORMATION $<S>_A$ — S2003

S2006

ENCRYPT FIFTH MANAGED INFORMATION $<S>_A$ AND TRANSMIT FIFTH MANAGED INFORMATION $[<S>_A]$

S2011

RECEIVE AND DECRYPT SIXTH MANAGED INFORMATION $[<\pi_B(S)>_A]$

RETURN

B

SECOND DEVICE

S2002

RECEIVE FIRST PUBLIC KEY PK1

S2004

ACQUIRE SEVENTH MANAGED INFORMATION $<S>_B$

S2005

ACQUIRE EIGHTH MANAGED INFORMATION $<\pi_B(S)>_B$

S2007

RECEIVE FIFTH MANAGED INFORMATION $[<S>_A]$

S2008

ACQUIRE THIRD PERMUTATION RESULT $[\pi_B(S)]=[<S>_A]+[<S>_B]$

S2009

ACQUIRE SIXTH MANAGED INFORMATION $[<\pi_B(S)>_A]=[\pi_B(S)]-[<\pi_B(S)>_B]$

S2010

TRANSMIT SIXTH MANAGED INFORMATION $[<\pi_B(S)>_A]$

RETURN

SECURE DISTRIBUTED COMPUTING SYSTEM AND COMPUTING METHOD

BACKGROUND OF THE INVENTION

1. Field of the Invention

The present disclosure relates to a computing system, a computing method, and an information storage medium.

2. Description of the Related Art

Hitherto, technologies for preventing leakage of information securely managed by a device have been investigated. For example, in Qinbin Li, Zeyi Wen, Zhaomin Wu, Sixu Hu, Naibo Wang, Yuan Li, Xu Liu, Bingsheng He, "A Survey on Federated Learning Systems: Vision, Hype and Reality for Data Privacy and Protection," Internet, retrieved on Mar. 16, 2023, https://arxiv.org/abs/1907.09693, there is described a method of federated learning for creating a learning model using a machine learning method without aggregating training data at one base location. It has been known that, in the federated learning, a plurality of devices each can execute training of a learning model without transmitting information securely managed by itself to another device.

SUMMARY OF THE INVENTION

For example, in such federated learning as described in Qinbin Li, Zeyi Wen, Zhaomin Wu, Sixu Hu, Naibo Wang, Yuan Li, Xu Liu, Bingsheng He, "A Survey on Federated Learning Systems: Vision, Hype and Reality for Data Privacy and Protection," Internet, retrieved on Mar. 16, 2023, https://arxiv.org/abs/1907.09693, there are demands to compute a secret product being a product of first secret information securely managed by a first device and second secret information securely managed by a second device in order to train the learning model. In fields other than the federated learning, there are similar demands in a case of computing a secret product being a product of a plurality of pieces of securely managed information. However, in this case, when the first device transmits the first secret information to the second device in a case in which the second device computes the secret product of the first secret information and the second secret information, the first secret information is transmitted over a network, and hence security is insufficient. Even when the first secret information is encrypted, there is a fear in that the first secret information may be decrypted by a third party. The same applies to a case in which the first device computes the secret product.

One object of the present disclosure is to enhance security.

According to at least one embodiment of the present disclosure, there is provided a computing system including: a first device configured to securely manage first secret information having the number of elements equal to or larger than two and first permutation information for permutating elements having the number of elements; and a second device configured to securely manage second secret information having the number of elements and second permutation information for permutating elements having the number of elements, wherein the first device is configured to: acquire first managed information managed by the first device from among first permutation results obtained as a result of permutating the first secret information based on the first permutation information and the second permutation information and distributively managed by the first device and the second device; and acquire second managed information managed by the first device from among second permutation results obtained as a result of permutating the second secret information based on the first permutation information and the second permutation information and distributively managed by the first device and the second device, wherein the second device is configured to: acquire third managed information managed by the second device from among the first permutation results; and acquire fourth managed information managed by the second device from among the second permutation results, and wherein the first managed information, the second managed information, the third managed information, and the fourth managed information are used to compute a secret product being a product of the first secret information and the second secret information.

BRIEF DESCRIPTION OF THE DRAWINGS

FIG. 2 is a diagram for showing an example of formulae in federated learning.

FIG. 5 is a diagram n for illustrating an example of functions implemented by the computing system.

FIG. 8 is a diagram for illustrating an example of a technical idea for acquiring an inner product of the first secret information and second secret information.

FIG. 11 is a diagram for illustrating an example of details of processing steps of from Step S200 to Step S203.

DETAILED DESCRIPTION OF THE INVENTION

[1. Outline of Computing System]

At least one embodiment of the present disclosure is described as an example of embodiments of a computing system according to the present disclosure. In the at least one embodiment, a case in which the computing system is used for federated learning in machine learning is taken as an example. The federated learning is a method of learning that is executed by a plurality of devices in a distributed manner. Any one of the plurality of devices aggregates learning results from other devices and creates a learning model.

In related-art learning, a device that executes training of a learning model is required to collect training data from other devices. Thus, there is a fear in that the training data may leak to a third party, thereby causing a concern from a security point of view. In this respect, in the federated learning, each individual device only transmits the learning results without transmitting the training data to another device in principle, and hence the federated learning is useful from the security point of view. For example, when the training data includes personal information, the federated learning can prevent leakage of the personal information.

Figure 1:
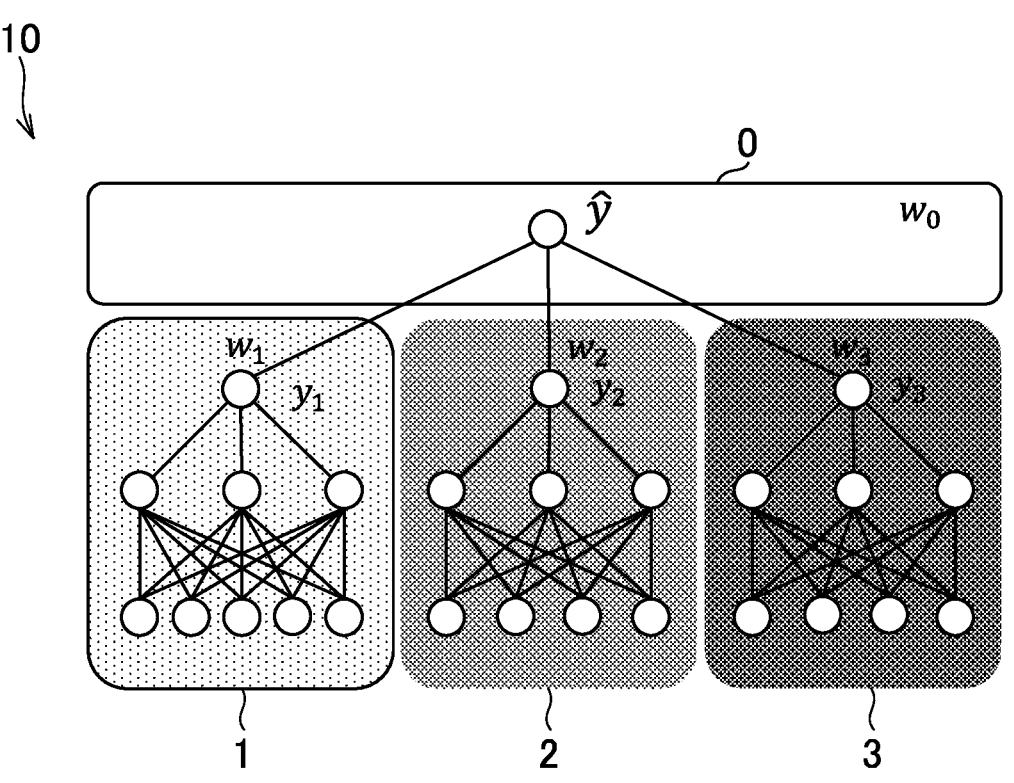
FIG. 1 is a diagram for illustrating an example of federated learning executed by a computing system.

FIG. 1 is a diagram for illustrating an example of federated learning executed in the computing system. In the example of FIG. 1, a case in which four services 0 to 3 cooperate with one another to execute federated learning is illustrated. For example, the service 0 is an information management service provided by a management company that manages various kinds of information relating to users. The service 1 is a financial service provided by a bank. The service 2 is a financial service provided by a securities company. The service 3 is an insurance service provided by an insurance company.

For example, computers for the respective services 0 to 3 cooperate with one another to execute federated learning. In FIG. 1, the computers are omitted. For the sake of simplification of FIG. 1, the following description is given on the assumption that execution subjects that execute the processing in the federated learning are the services 0 to 3, but in an actual case, the execution subjects are the computers for the respective services 0 to 3. Unless distinguished from one another, the services 0 to 3 are hereinafter referred to as "services" with the reference numerals omitted.

For example, in the federated learning, each service initializes its own learning model. Each service executes the training of its own learning model based on training data managed by itself. In principle, the training data is not disclosed to third parties. The training data is securely managed by each service. In the at least one embodiment, a case in which a learning model for estimating an annual income of a user is created in federated learning is taken as an example, but a learning model may be created for any other purpose. For example, a learning model for estimating an attribute other than the annual income, a learning model for use in image processing, a learning model for use in natural language processing, or another learning model may be created in federated learning.

For example, the training data includes demographic information that is considered to be correlated with the annual income, payment history in the service, browsing history of web pages, or other information. Each service manages the training data on its own, and does not transmit the training data to the outside in principle. In the at least one embodiment, a case in which features of each user who uses all the services 1 to 3 are indicated in the training data is taken as an example, but it suffices that features of each user who uses at least one of the services 1 to 3 are indicated in the training data.

FIG. 2 is a diagram for showing an example of formulae in the federated learning. For example, the service 1 executes the training of a learning model M1 for estimating the annual income of the user based on training data indicating a feature $x_1$ of each user securely managed by the bank. The service 2 executes the training of a learning model M2 for estimating the annual income of the user based on training data indicating a feature $x_2$ of each user securely managed by the securities company. The service 3 executes the training of a learning model M3 for estimating the annual income of the user based on training data indicating a feature $x_3$ of each user securely managed by the insurance company.

In the example of FIG. 2, a concept that includes the features $x_1$, $x_2$, and $x_3$ is represented as "feature X." The feature X is in a format of a matrix of n×m, where "n" and "m" each represent any natural number. For example, the service 0 manages a label "y" that is the annual income serving as a ground truth. In the example of FIG. 2, "y" represents a matrix of n×1 (so-called column vector). The service 0 collects local learning results obtained by the respective services 1 to 3, and executes the training of a learning model M0 for estimating the annual income of the user.

In the example of FIG. 1, the service 0 creates a learning model M0 for estimating the annual income "y" of the user based on an estimation result $y_1$ obtained by the learning model M1, an estimation result $y_2$ obtained by the learning model M2, and an estimation result $y_3$ obtained by the learning model M3. That is, the estimation results $y_1$ to $y_3$ are input to the learning model M0. The learning model M0 computes a feature amount based on the estimation results $y_1$ to $y_3$, and outputs the annual income "y" of the user as an estimation result corresponding to the feature amount. The learning model M0 can be said to be a model in stacking learning that is a type of ensemble learning using the estimation results $y_1$ to $y_3$ obtained by the learning models M1 to M3.

For example, the learning model M0 includes weighting factors $w_0$ to $w_4$ as parameters to be adjusted in learning. The learning model M0 may include another parameter (for example, bias) different from the weighting factors $w_0$ to $w_4$. In FIG. 2, "i" represents a numerical value indicating each individual user. As shown in FIG. 2, a loss L is computed based on a difference between a label $y_1$ serving as the ground truth and an estimation result $y_1$ (above which a symbol is added in FIG. 2) obtained by the learning model M0. The service 0 executes the training of the learning model M0 so that the loss L becomes smaller.

For example, the service 0 transmits the learning result obtained by the learning model M0 to each of the services 1 to 3. The service 1 updates the learning model M1 based on the learning result obtained by the learning model M0. The service 2 updates the learning model M2 based on the learning result obtained by the learning model M0. The service 3 updates the learning model M3 based on the learning result obtained by the learning model M0. Each of the services 1 to 3 transmits a new learning result to the service 0. In the same manner from then on, the service 0 and each of the services 1 to 3 repeatedly share the learning results with one another, and the learning models M0 to M3 are thus expected to be improved.

In the at least one embodiment, it is assumed that, although lines are omitted for the sake of simplification in FIG. 1, the services 1 to 3 share the learning results with one another. For example, the service 1 acquires the learning results obtained by the learning models M2 and M3 from the services 2 and 3, and updates the learning model M1. The service 2 acquires the learning results obtained by the learning models M1 and M3 from the services 1 and 3, and updates the learning model M2. The service 3 acquires the learning results obtained by the learning models M1 and M2 from the services 1 and 2, and updates the learning model M3.

The learning models M0 to M3 are hereinafter referred to simply as "learning models M" unless distinguished from one another. A learning method itself of the learning model M may be a publicly known method, and it is possible to use, for example, a gradient descent method or an error back-propagation method. In the at least one embodiment, a case in which the types and learning methods of the learning models M are the same is taken as an example, but at least one of the types or learning methods of the learning models M may differ from one another. For example, the learning model M0 may be a neural network, the learning model M1 may be a support vector machine, the learning model M2 may be a gradient-boosted regression tree, and the learning model M3 may be a linear regression model. Any one of methods corresponding to those types may be used as the learning method.

In the at least one embodiment, a case in which the learning model M is a neural network and the learning method of the learning model M is the gradient descent method is taken as an example. In the gradient descent method, parameters of the learning model M are iteratively updated, and a gradient (inclination) of the loss is computed to update the parameters in a direction in which the gradient most greatly descends. For example, when the gradient descent method is used in the training of the learning model M0, such differential formulae as shown in FIG. 2 are used. Similar formulae are used when the gradient descent method is used in the training of the learning models M1 to M3. The gradient descent method itself is a publicly known technology, and hence details of the formulae of FIG. 2 are omitted.

For example, the underlined parts in one of the formulae of FIG. 2 is an inner product of the column vector relating to the service 1 and the column vector relating to the service 2. When the services 1 and 2 execute the training of the learning models M1 and M2, respectively, it is required to acquire similar information. In this case, the services 1 and 2 are required to acquire the inner product underlined in the formula of FIG. 2 without transmission of information required to be securely managed. Table C1 of FIG. 2 is obtained by generalizing a problem for satisfying such a requirement. When the problem of Table C1 can be solved, the computing system can acquire the inner product without causing the services to transmit the securely managed information to each other.

Figure 3:
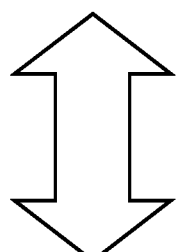
FIG. 3 includes tables for showing specific examples of a problem of the table of FIG. 2.

FIG. 3 includes tables for showing specific examples of the problem of Table C1 of FIG. 2. For example, a first device A for a certain service securely manages an m-dimensional vector "a". A second device B for another service securely manages an m-dimensional vector "b". For example, an element included in an m-dimensional vector indicates some feature relating to each individual user. The second device B requires high security. From a security point of view, there is a constraint that the first device A and the second device B each transmit some integrated information in place of the vector "a" and the vector "b".

For example, as shown in Table C2, when the second device B can acquire an inner product a·b of the vector "a" and the vector "b" without acquiring the vector "a" from the first device A, the inner product a·b acquired in this manner is useful for the training of the learning model M managed by the second device B. In the at least one embodiment, an example of this method is described. In contrast, as shown in Table C3, when the first device A can acquire the inner product a·b of the vector "a" and the vector "b" without acquiring the vector "b" from the second device B, the inner product a·b acquired in this manner is useful for the training of the learning model M managed by the first device A. The computing system 10 is also capable of executing this method.

[2. Hardware Configuration of Computing System]

Figure 4:
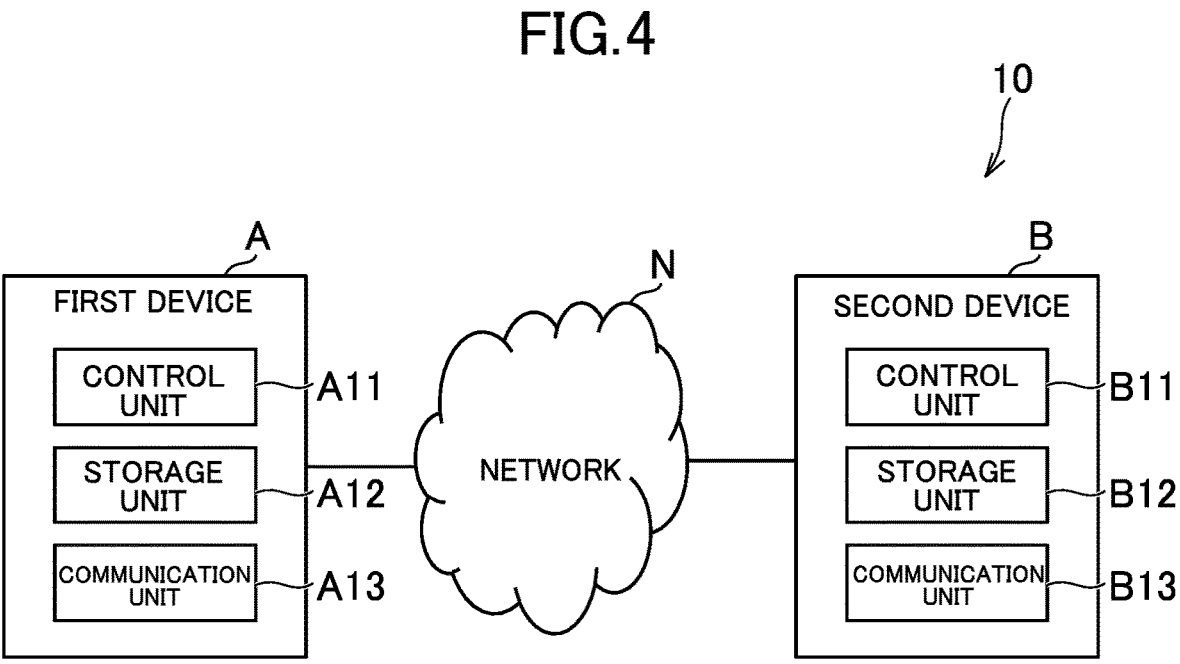
FIG. 4 is a diagram for illustrating an example of a hardware configuration of a computing system.

FIG. 4 is a diagram for illustrating an example of a hardware configuration of the computing system. The first device A and the second device B are connected to each other through a network N such as the Internet or a LAN.

The first device A is a computer for a first service. In the at least one embodiment, a case in which the first service is the service 1 (service provided by the bank) of FIG. 1 is taken as an example, but the first service may be any other service. For example, the first service may be one of the services 0, 2, and 3 of FIG. 1, and may be another service that is not illustrated in FIG. 1. The other service may be a communication service, an electronic commerce service, a travel booking service, an electronic payment service, or a reward point management service.

For example, the first device A is a server computer, a personal computer, a tablet computer, or a smartphone. The first device A includes a control unit A11, a storage unit A12, and a communication unit A13. The control unit A11 includes at least one processor. The storage unit A12 includes a volatile memory such as a RAM and a nonvolatile memory such as a flash memory. The communication unit A13 includes at least one of a communication interface for wired communication or a communication interface for wireless communication.

The second device B is a computer for a second service. For example, the second device B is a server computer, a personal computer, a tablet computer, or a smartphone. The second device B includes a control unit B11, a storage unit B12, and a communication unit B13. Hardware configurations of the control unit B11, the storage unit B12, and the communication unit B13 are the same as the control unit A11, the storage unit A12, and the communication unit A13, respectively.

In the at least one embodiment, a case in which the second service is the service 2 (service provided by the securities company) of FIG. 1 is taken as an example, but the second service may be any other service. For example, the second service may be the same as the first service. When the second service is different from the first service, the second service may be a service other than the first service among the services exemplified in the description of the first service. The first device A and the second device B may be devices that are used privately or for other purposes irrespective of any specific service.

In the at least one embodiment, a case in which the second device B requires higher security than the first device A is taken as an example. For example, imposing limitations on data that can be transmitted to the network N corresponds to the high security. When the second device B transmits the same type of data as that of the first device A to the outside, the second device B is required to process the data to a larger extent than the first device A. For example, the first device A is allowed to transmit the data having a matrix format to the network N without changing the number of rows, but the second device B is required to change the number of rows of data having a matrix format to transmit the data to the network N.

Unless distinguished from each other, the first device A and the second device B are hereinafter referred to simply as "devices" with the reference symbols omitted. Unless distinguished from each other, the control units A11 and B11, the storage units A12 and B12, and the communication units A13 and B13 are hereinafter referred to as "control units 11," "storage units 12," and "communication units 13," respectively, with the affixed alphabetical characters omitted. A program stored in the storage unit 12 may be supplied to the device through the network N. Further, a program stored in a computer-readable information storage medium may be supplied to the device through a reading unit (for example, optical disc drive or memory card slot) that reads the information storage medium or an input/output unit (for example, USB port) for inputting and outputting data to/from an external device.

In addition, in the computing system 10, the plurality of devices including the first device A, the second device B, and the other device may be able to communicate to/from one another. That is, the computing system 10 may include another device different from the first device A and the second device B. For example, the other device is a server computer, a personal computer, a tablet computer, or a smartphone. The computing system 10 may include a plurality of other devices. When there are four services as in FIG. 1, the computing system 10 includes the first device A, the second device B, and at least two other devices.

For example, when the computing system 10 includes the other device, the second device B requires relatively high security among the plurality of devices. The other device may have the same function as that of the first device A or the second device B. When the other device has the same function as that of the first device A, the computing system 10 including the first device A and the other device means the computing system 10 including a plurality of first devices A. When the other device has the same function as that of the second device B, the computing system 10 including the second device B and the other device means the computing system 10 including a plurality of second devices B.

[3. Functions Implemented by Computing System]

FIG. 5 is a diagram for illustrating an example of functions implemented by the computing system 10. For example, the first device A includes a first data storage unit A100, a first secret information acquisition module A101, a first permutation information acquisition module A102, a first managed information acquisition module A103, a second managed information acquisition module A104, a fifth managed information acquisition module A105, a first public information reception module A106, a tenth managed information acquisition module A107, a second public information acquisition module A108, a second public information transmission module A109, a fifth managed information transmission module A110, a first key acquisition module A111, a first public key transmission module A112, an eleventh managed information acquisition module A113, a twelfth managed information acquisition module A114, a third public information reception module A115, a second computation information acquisition module A116, a sixteenth managed information acquisition module A117, a fourth public information acquisition module A118, a fourth public information transmission module A119, a thirteenth managed information reception module A120, a sixth permutation result acquisition module A121, a fifteenth managed information acquisition module A122, a fifteenth managed information transmission module A123, a second public key reception module A124, a first managed product acquisition module A125, a first sum acquisition module A126, a second sum reception module A127, and a secret product computing module A128.

For example, the first data storage unit A100 is implemented by the storage unit A12. The first secret information acquisition module A101, the first permutation information acquisition module A102, the first managed information acquisition module A103, the second managed information acquisition module A104, the fifth managed information acquisition module A105, the first public information reception module A106, the tenth managed information acquisition module A107, the second public information acquisition module A108, the second public information transmission module A109, the fifth managed information transmission module A110, the first key acquisition module A111, the first public key transmission module A12, the eleventh managed information acquisition module A113, the twelfth managed information acquisition module A114, the third public information reception module A115, the second computation information acquisition module A116, the sixteenth managed information acquisition module A117, the fourth public information acquisition module A118, the fourth public information transmission module A119, the thirteenth managed information reception module A120, the sixth permutation result acquisition module A121, the fifteenth managed information acquisition module A122, the fifteenth managed information transmission module A123, the second public key reception module A124, the first managed product acquisition module A125, the first sum acquisition module A126, the second sum reception module A127, and the secret product computing module A128 are implemented by the control unit A11.

For example, the second device B includes a second data storage unit B100, a second secret information acquisition module B101, a second permutation information acquisition module B102, a third managed information acquisition module B103, a fourth managed information acquisition module B104, a seventh managed information acquisition module B105, an eighth managed information acquisition module B106, a first public information acquisition module B107, a first public information transmission module B108, a second public information reception module B109, a first computation information acquisition module B110, a fifth managed information reception module B111, a third permutation result acquisition module B112, a sixth managed information acquisition module B113, a sixth managed information transmission module B114, a first public key reception module B115, a thirteenth managed information acquisition module B116, a fourteenth managed information acquisition module B117, a third public information acquisition module B118, a third public information transmission module B119, a fourth public information reception module B120, a third computation information acquisition module B121, a second key acquisition module B122, a second public key transmission module B123, a second managed product acquisition module B124, a second sum acquisition module B125, and a second sum transmission module B126.

For example, the second data storage unit B100 is implemented by the storage unit B12. The second secret information acquisition module B101, the second permutation information acquisition module B102, the third managed information acquisition module B103, the fourth managed information acquisition module B104, the seventh managed information acquisition module B105, the eighth managed information acquisition module B106, the first public information acquisition module B107, the first public information transmission module B108, the second public information reception module B109, the first computation information acquisition module B110, the fifth managed information reception module B111, the third permutation result acquisition module B112, the sixth managed information acquisition module B113, the sixth managed information transmission module B114, the first public key reception module B115, the thirteenth managed information acquisition module B116, a thirteenth managed information transmission module, the fourteenth managed information acquisition module B117, the third public information acquisition module B118, the third public information transmission module B119, the fourth public information reception module B120, the third computation information acquisition module B121, the second key acquisition module B122, the second public key transmission module B123, the second managed product acquisition module B124, the second sum acquisition module B125, and the second sum transmission module B126 are implemented by the control unit B11.

[First Data Storage Unit]

The first data storage unit A100 stores data required for processing to be executed by the first device A. For example, the first data storage unit A100 stores a first learning model AM. The first learning model AM is the learning model M managed by the first device A. The first device A uses the method of the federated learning to execute the training of the first learning model AM.

For example, the first device A securely manages first secret information "a" having the number "i" (where "i" represents an integer equal to or larger than two) of elements equal to or larger than two. The first data storage unit A100 stores the first secret information "a". The first secret information "a" is information securely managed by the first device A. The first secret information "a" is not transmitted to any device other than the first device A in principle. The first secret information "a" includes a plurality of elements. The elements are numerical values that form the first secret information "a". In the at least one embodiment, a case in which the first secret information "a" has a vector format is taken as an example, but the first secret information "a" may be any information which includes a plurality of elements and based on which a product can be computed, for example, may be a plurality of numerical values, a matrix, an array, a data frame, or other information.

In the at least one embodiment, the first device A computes the first secret information "a" in course of the training of the first learning model AM in the federated learning. For example, the first device A may acquire a part of the parameters of the first learning model AM as the first secret information "a", or may acquire information computed from the part as the first secret information "a". For example, the first secret information "a" is a value obtained by multiplying the part of the parameters of the first learning model AM under the present circumstances by an estimation result obtained by the first learning model AM under the present circumstances.

The first secret information "a" may be information relating to each of a plurality of users in the first service. For example, the first secret information "a" may include a value obtained by multiplying the part of the parameters of the first learning model AM under the present circumstances by an estimation result of the annual income of each of the plurality of users obtained by the first learning model AM under the present circumstances. In this case, the number of dimensions of the first secret information "a" is the number of users. The first secret information "a" may also be, for example, information in which personal information, such as an age group or a gender of the user, is digitized (quantified). The first secret information "a" may be information obtained by digitizing each of a plurality of pieces of personal information of the user.

In addition, user identification information on each of the plurality of users in the first service and user identification information on each of the plurality of users in the second service may be the same. The user identification information is information that can identify the user. For example, a login account, an email address, or a telephone number correspond to the user identification information. In the at least one embodiment, a case in which the user identification information is common in the first service and the second service is taken as an example, but the user identification information may be different between the first service and the second service. In this case, it is assumed that, for each user, there is data that defines a correspondence relationship between the user identification information in the first service and the user identification information in the second service. It is assumed that the data is stored in the first data storage unit A100, the second data storage unit B100, or another place.

For example, the first device A securely manages first permutation information $\pi A$ for permutating "i" elements. The first data storage unit A100 stores the first permutation information $\pi_A$. The first permutation information $\pi_A$ is information securely managed by the first device A. The first permutation information $\pi_A$ is not transmitted to any device other than the first device A in principle. The first permutation information $\pi_A$ indicates a rule for permutating the elements. For example, the first permutation information $\pi_A$ indicates a relationship between an order of the elements before the permutation and an order of the elements after the permutation. In the at least one embodiment, a case in which the first permutation information $\pi_A$ has an array format is taken as an example, but the first permutation information $\pi_A$ may indicate any rule for permutating the elements, and may be, for example, a single numerical value, a plurality of numerical values, a matrix, a vector, a data frame, or other information.

The data stored in the first data storage unit A100 is not limited to the above-mentioned example. The first data storage unit A100 can store any data. For example, the first data storage unit A100 stores the training data for the first learning model AM. The training data includes an input part to be input to the first learning model AM and an output part corresponding to the input part. The output part corresponds to a ground truth at a time of training. The first device A executes local training of the first learning model AM based on the training data stored in the first data storage unit A100. When the input part of the training data is input, the first device A adjusts the parameters of the first learning model AM so that the output part of the training data is output.

In the at least one embodiment, the first learning model AM for estimating the annual income of the user is created, and hence the input part of the training data is some information relating to the user. For example, a feature such as the demographic information on the user in the first service corresponds to the input part of the training data. The output part of the training data is the annual income of the user. The annual income corresponding to the output part of the training data may be an annual income registered in the first service by the user, or may be an annual income registered in another service by the user. The annual income corresponding to the output part of the training data may be an annual income designated by a creator of the first learning model AM. The first device A may use the method of the federated learning to update the locally trained first learning model AM. For example, the first data storage unit A100 may store not only the data described above but also various kinds of information described in the at least one embodiment.

[Second Data Storage Unit]

The second data storage unit B100 stores data required for the processing to be executed by the second device B. For example, the second data storage unit B100 stores a second learning model BM. The second learning model BM is the learning model M managed by the second device B. The second device B uses the method of the federated learning to execute the training of the second learning model BM.

For example, the second device B securely manages the second secret information "b" having the number "i" of elements. The second data storage unit B100 stores the second secret information "b". The second secret information "b" is information securely managed by the second device B. The second secret information "b" is not transmitted to any device other than the second device B in principle. The second secret information "b" is information indicating one numerical value or information including a plurality of numerical values. In the at least one embodiment, a case in which the second secret information "b" has a vector format is taken as an example, but the second secret information "b" may be any information which includes a plurality of elements and based on which a product can be computed, for example, may be a plurality of numerical values, a matrix, an array, a data frame, or other information.

In the at least one embodiment, the second device B computes the second secret information "b" in course of the training of the second learning model BM in the federated learning. For example, the second device B may acquire a part of the parameters of the second learning model BM as the second secret information "b", or may acquire information computed from the part as the second secret information "b". For example, the second secret information "b" is a value obtained by multiplying the part of the parameters of the second learning model BM under the present circumstances by an estimation result obtained by the second learning model BM under the present circumstances.

The second secret information "b" may be information relating to each of a plurality of users in the second service. For example, the second secret information "b" may include a value obtained by multiplying the part of the parameters of the second learning model BM under the present circumstances by an estimation result of the annual income of each of the plurality of users obtained by the second learning model BM under the present circumstances. In this case, the number of dimensions of the second secret information "b" is the number of users. The second secret information "b" may also be, for example, information in which personal information, such as an age group or a gender of the user, is digitized (quantified). The second secret information "b" may be information obtained by digitizing each of a plurality of pieces of personal information of the user.

For example, the second device B securely manages second permutation information πs for permutating "i" elements. The second data storage unit B100 stores the second permutation information πB. The second permutation information $\pi_B$ is information securely managed by the second device B. The second permutation information $\pi_B$ is not transmitted to any device other than the second device B in principle. The second permutation information $\pi_B$ indicates a rule for permutating the elements. For example, the second permutation information $\pi_B$ indicates a relationship between an order of the elements before the permutation and an order of the elements after the permutation. In the at least one embodiment, a case in which the second permutation information $\pi_B$ has an array format is taken as an example, but the second permutation information $\pi_B$ may indicate any rule for permutating the elements, and may be, for example, a single numerical value, a plurality of numerical values, a matrix, a vector, a data frame, or other information.

The data stored in the second data storage unit B100 is not limited to the above-mentioned example. The second data storage unit B100 can store any data. For example, the second data storage unit B100 stores the training data for the second learning model BM. The training data includes an input part to be input to the second learning model BM and the output part corresponding to the input part. The output part corresponds to a ground truth at the time of training. The second device B executes local training of the second learning model BM based on the training data stored in the second data storage unit B100. When the input part of the training data is input, the second device B adjusts the parameters of the second learning model BM so that the output part of the training data is output.

In the at least one embodiment, the second learning model BM for estimating the annual income of the user is created, and hence the input part of the training data is some information relating to the user. For example, a feature such as the demographic information on the user in the second service corresponds to the input part of the training data. The output part of the training data is the annual income of the user. The annual income corresponding to the output part of the training data may be an annual income registered in the second service by the user, or may be an annual income registered in another service by the user. The annual income corresponding to the output part of the training data may be an annual income designated by a creator of the second learning model BM. The second device B may use the method of the federated learning to update the locally trained second learning model BM. For example, the second data storage unit B100 may store not only the data described above but also various kinds of information described in the at least one embodiment.

Figure 6:
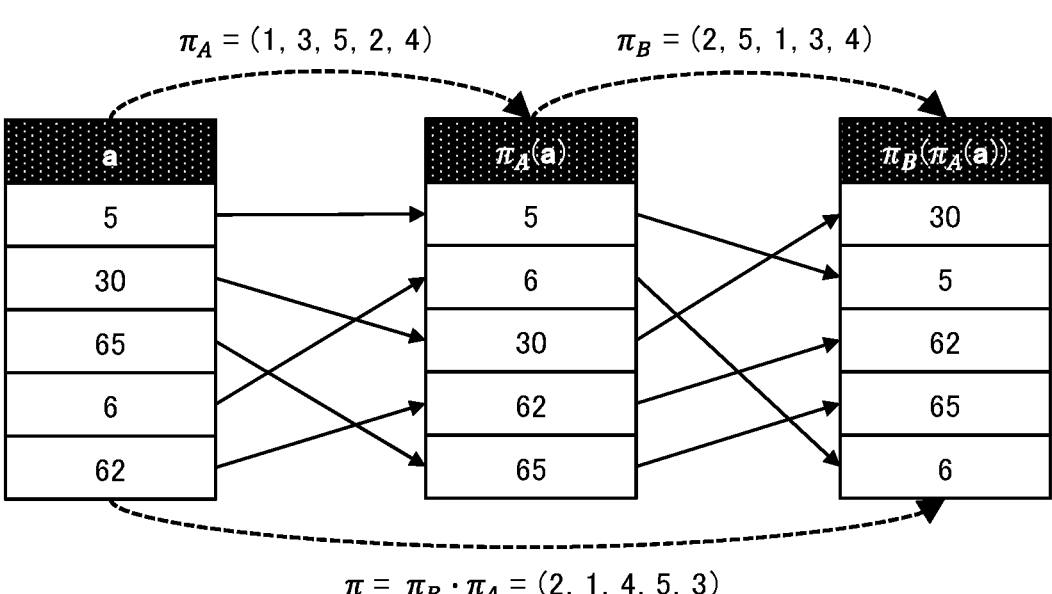
FIG. 6 is a diagram for illustrating an example of permutation of first secret information which is executed based on first permutation information and second permutation information.
Figure 7:
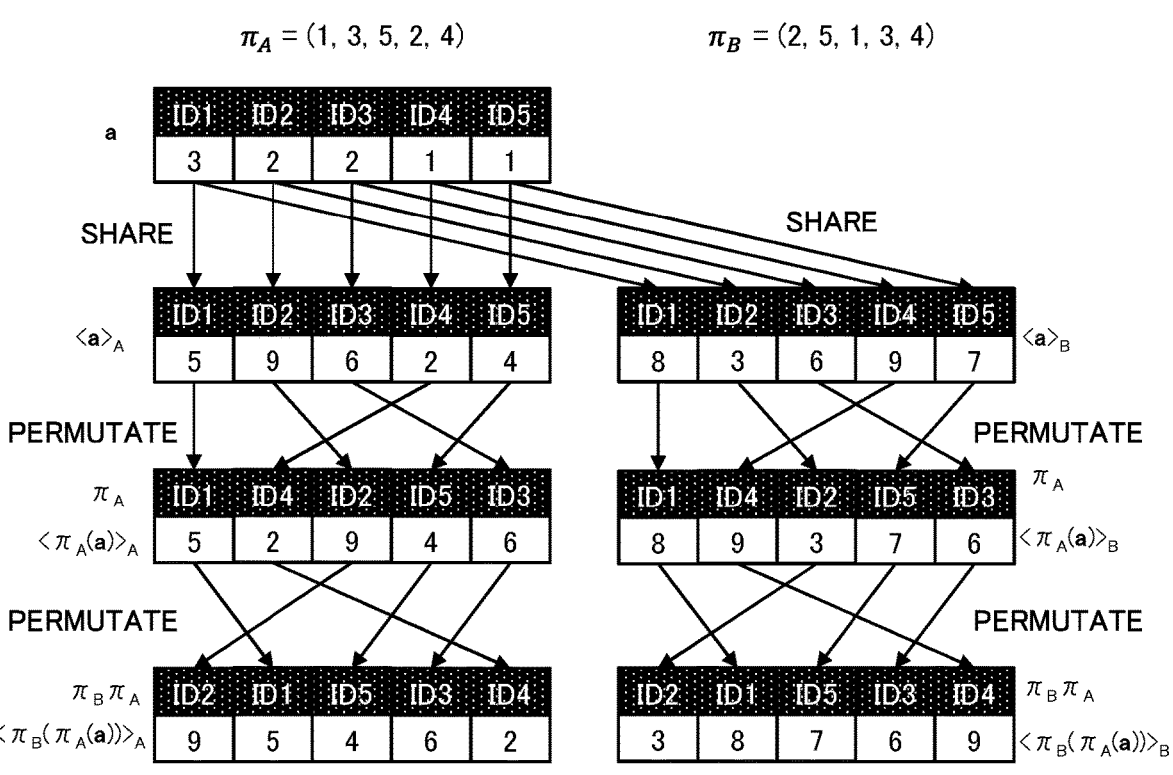
FIG. 7 is a diagram for illustrating an example of how the first secret information is shared.

Now, referring to FIG. 6 to FIG. 8, a technical idea relating to processing executed by the functions other than the first data storage unit A100 and the second data storage unit B100 is described.

FIG. 6 is a diagram for illustrating an example of the permutation of the first secret information "a" which is executed based on the first permutation information $\pi_A$ and the second permutation information $\pi_B$. The permutation of FIG. 6 is not processing that is actually executed by the first device A and the second device B. The permutation of FIG. 6 is an example for describing the above-mentioned technical idea. In the example of FIG. 6, the first secret information "a" is (5, 30, 65, 6, 62). The number "i" of elements is five. The first permutation information $\pi_A$ is (1, 3, 5, 2, 4). Arrays are sometimes represented by square brackets, but in the example of FIG. 6, the arrays are assumed to be represented by parentheses. The second permutation information $\pi_B$ is (2, 5, 1, 3, 4).

For example, each element of the first permutation information $\pi_A$ and the second permutation information πB indicates an order position after the permutation. An m-th element (where "m" is a natural number equal to or smaller than "i") of the first permutation information MA is the order position of the m-th element of the first secret information "a" after the permutation. In the example of FIG. 6, the first permutation information $\pi_A$ is (1, 3, 5, 2, 4), and hence the first element of the first secret information "a" remains the first element after the permutation. The second element of the first secret information "a" becomes the third element after the permutation. The third element of the first secret information "a" becomes the fifth element after the permutation. The fourth element of the first secret information "a" becomes the second element after the permutation. The fifth element of the first secret information "a" becomes the fourth element after the permutation.

In the at least one embodiment, a permutation result obtained by permutating the first secret information "a" based on the first permutation information $\pi_A$ is represented by NA (a). Other permutation results are also denoted by reference symbols in accordance with the same rule. The permutation result is a state exhibited after information to be permutated has been permutated. In the example of FIG. 6, the first secret information "a" after having been permutated based on the first permutation information $\pi_A$ corresponds to the permutation result $\pi_A$ (a). The permutation result $\pi_A$ (a) is (5, 6, 30, 62, 65).

In the at least one embodiment, it is assumed that a permutation rule based on the second permutation information NIB is the same as a permutation rule based on the first permutation information $\pi_A$, but the permutation rule based on the first permutation information $\pi_A$ and the permutation rule based on the second permutation information $\pi_B$ may be different from each other. In the example of FIG. 6, a permutation result $\pi_B$ ($\pi_A$ (a)) obtained by permutating the permutation result $\pi_A$ (a) based on the second permutation information $\pi_B$ is (30, 5, 62, 65, 6). Assuming that the permutation information indicating final permutation is $\pi$, $\pi$ is (2, 1, 4, 5, 3). The sign "·" in $\pi_A \cdot \pi_B$ of FIG. 6 is a sign for indicating not a product but a final permutation order.

FIG. 7 is a diagram for illustrating an example of how the first secret information "a" is shared. In the at least one embodiment, with none of the first secret information "a", the second secret information "b", the first permutation information NA, or the second permutation information $\pi_B$ being transmitted to the network N, secret sharing is used in order to compute an inner product of the first secret information "a" and the second secret information "b". The secret sharing is a method of sharing fragments of random numbers that have no meaning by themselves. When all or some of shares have been collected, original data is restored. With the technical idea of the permutation being applied to the publicly known secret sharing, the at least one embodiment has an innovative configuration compared to related-art technologies.

In the example of FIG. 7, the first secret information "a" is (3, 2, 2, 1, 1). ID1 to ID5 described in the first secret information "a" are pieces of user identification information. For example, the first element of the first secret information "a" is a piece of information relating to a user of ID1. In the same manner, the second to fifth elements of the first secret information "a" are pieces of information relating to users of ID2 to ID5, respectively. ID1 to ID5 described in the second secret information "b" of FIG. 8 described later have the same meanings as those of the ID1 to ID5 described in the first secret information "a". Thus, a user corresponding to the m-th element of the first secret information "a" and a user corresponding to an mb-th element of the second secret information "b" are the same user.

In the example of FIG. 7, the first permutation information $\pi_A$ is (1, 3, 5, 2, 4). The second permutation information $\pi_B$ is (2, 5, 1, 3, 4). As illustrated in FIG. 7, when the first secret information "a" is shared by the secret sharing, the first device A manages information $<a>_A$. The second device B manages information $<a>_B$. In this manner, in the at least one embodiment, information to be shared by the secret sharing is enclosed by symbols "<" and ">", and a subject that manages the information is indicated by the character "A" or "B" placed after the symbol ">". The information to be shared by the secret sharing is sometimes referred to simply as "share." Each of information $<a>_A$ and information $<a>_B$ is fragments of random numbers, and once those have been collected, the first secret information "a" can be restored. A publicly known method can be used as the secret sharing itself.

For example, the information $<a>_A$ managed by the first device A is (5, 9, 6, 2, 4). A permutation result $<\pi_A$ (a)$>_A$ obtained by permutating the information $<a>_A$ based on the first permutation information $\pi_A$ is (5, 2, 9, 4, 6). Suppose that the information $<\pi_A$ (a)$>_A$ is permutated based on the second permutation information $\pi_B$, a permutation result $<\pi_B$ ($\pi_A$ (a))$>_A$ is (9, 5, 4, 6, 2). The first device A cannot acquire the second permutation information $\pi_B$, and hence this permutation is not directly executed by the first device A. The permutation is described only for describing the technical idea of the at least one embodiment.

For example, the information $<a>_B$ managed by the second device B is (8, 3, 6, 9, 7). Suppose that the information $<a>_B$ is permutated by the first permutation information $\pi_A$, a permutation result $<\pi_A$ (a)$>_B$ is (8, 9, 3, 7, 6). The second device B cannot acquire the first permutation information $\pi_A$, and hence this permutation is not directly executed by the second device B. The permutation is described only for describing the technical idea of the at least one embodiment. A permutation result $\pi_B$ ($\pi_A$ (a)) $>_B$ obtained by permutating the information $<\pi_A$ (a)$>3$ based on the second permutation information $\pi_B$ is (3, 8, 7, 6, 9).

As illustrated in FIG. 7, the first secret information "a" is shared by the first device A and the second device B after the technical idea of the permutation is applied to the first secret information "a". In the same manner, the second secret information "b" is shared by the first device A and the second device B after the technical idea of the permutation is applied to the second secret information "b". When those are successfully shared, at least one of the first device A or the second device B can acquire the inner product of the first secret information "a" and the second secret information "b". In the at least one embodiment, a case in which the first device A acquires the inner product of the first secret information "a" and the second secret information "b" is taken as an example, but the second device B may acquire the inner product of the first secret information "a" and the second secret information "b".

FIG. 8 is a diagram for illustrating an example of the technical idea for acquiring the inner product of the first secret information "a" and the second secret information "b". In the example of FIG. 8, the second secret information "b" is (1, 3, 1, 2, 3). The inner product of the first secret information "a" and the second secret information "b" is 16. For example, when the remainder of division by 10 is used for learning, a final inner product is 6. As illustrated in FIG. 8, in the at least one embodiment, a problem for computing the inner product of the first secret information "a" and the second secret information "b" is defined as a problem for causing the first device A to acquire the permutation result $<\pi_B(\pi_A(a))>_A$, $<\pi_B(\pi_A$ (b))$>_A$ and causing the second device B to acquire the permutation result $<\pi_B(\pi_A(a))>_B$, $<\pi_B(\pi_A$ (b))$>_B$.

An example of processing for solving this problem is described below. That is, an example of the processing executed by the functions other than the first data storage unit A100 and the second data storage unit B100 is described.

Figure 9:
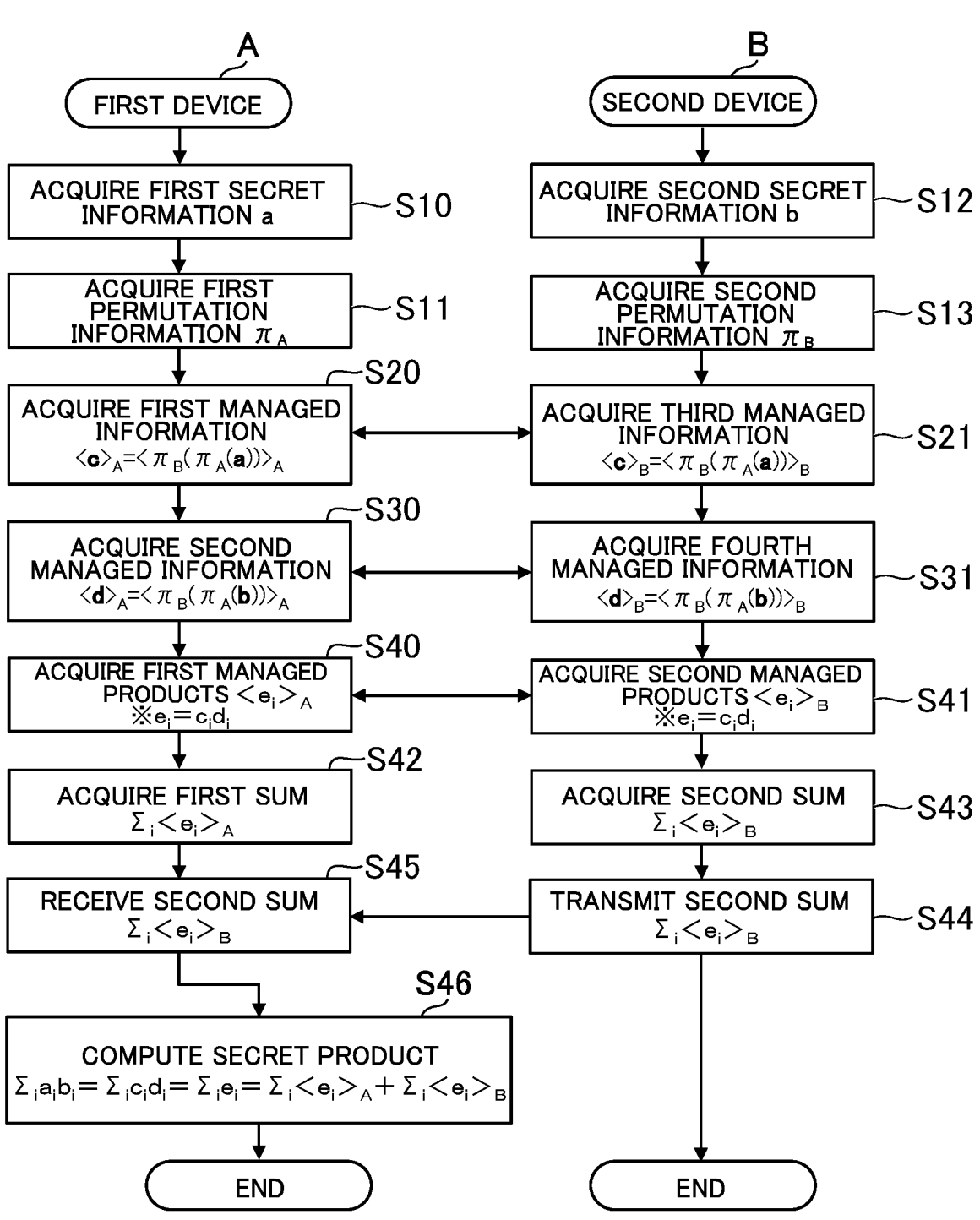
FIG. 9 is a diagram for illustrating an example of processing executed by the computing system.
Figure 10:
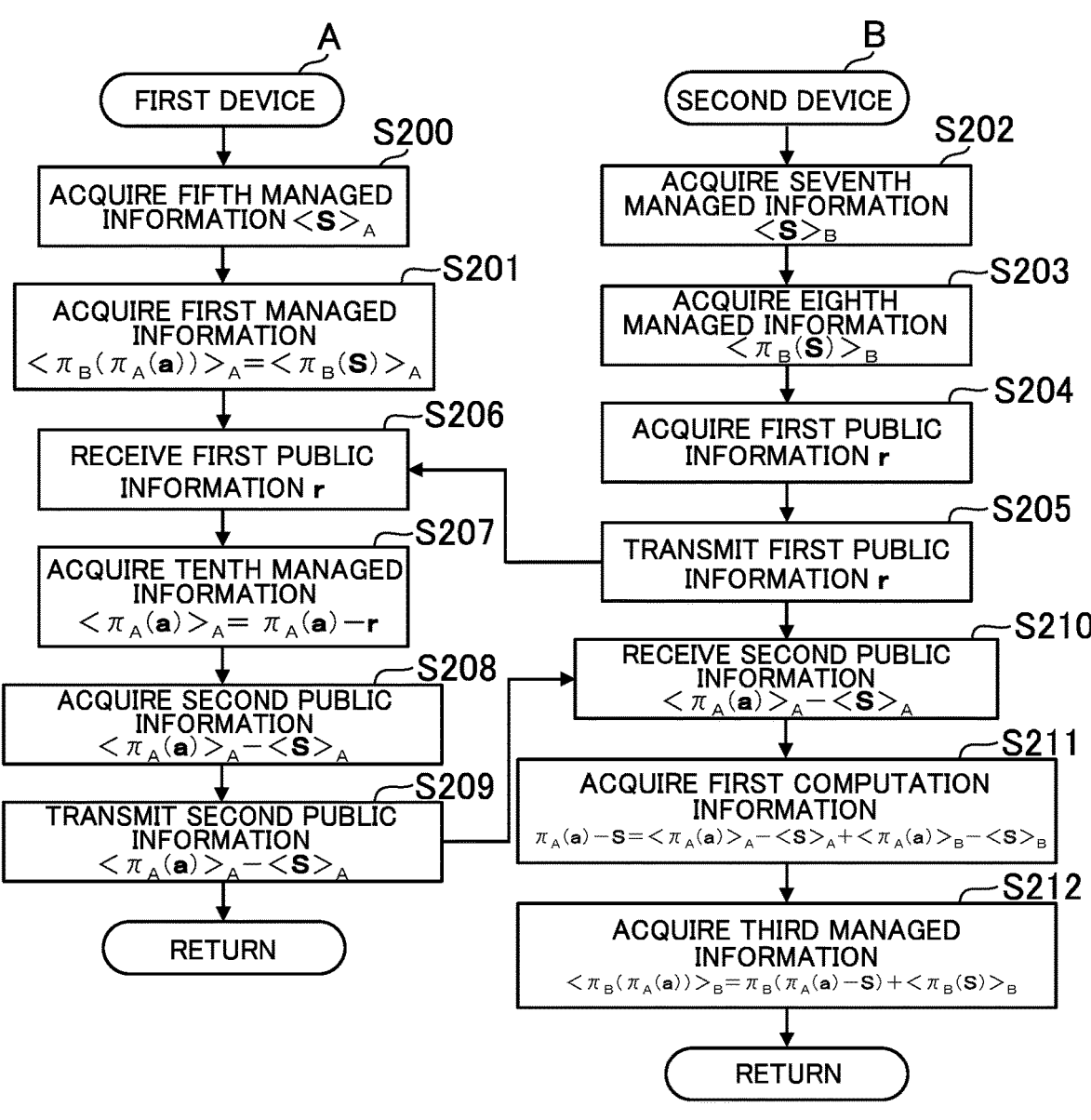
FIG. 10 is a diagram for illustrating an example of details of processing steps of Step S20 and Step S21.

FIG. 9 is a diagram for illustrating an example of the processing executed by the computing system 10. The processing of FIG. 9 corresponds to a main routine. Processing steps of from FIG. 10 correspond to subroutines. That is, the processing of FIG. 9 is overall processing executed by the computing system 10. The processing steps of from FIG. 10 are specific examples of individual processing steps. The processing of FIG. 9 is executed by the first device A executing the program stored in the first data storage unit A100 and the second device B executing the program stored in the second data storage unit B100.

For example, the first secret information acquisition module A101 acquires the first secret information "a" stored in the first data storage unit A100 (Step S10). The first secret information "a" is read out by the processing step of Step S10 to be loaded into a memory area of the nonvolatile memory. When the first secret information "a" has been loaded in the memory area in advance, the processing step of Step S10 is not required to be executed.

For example, the first permutation information acquisition module A102 acquires the first permutation information $\pi_A$ (Step S11). In Step S11, the first permutation information acquisition module A102 generates the first permutation information $\pi_A$ based on random numbers. For example, the first permutation information acquisition module A102 generates the same number of random numbers as the number "i" of elements, and uses the random numbers as the respective elements of the first permutation information $\pi_A$. As an algorithm for generating the random numbers, it is possible to use a publicly known algorithm. For example, the random numbers may be generated based on a linear congruential method, a multiplicative congruential method, an M-sequence method, or the Mersenne twister method. The first device A can generate the random numbers based on any one of those methods when the random numbers are required in the subsequent processing.

The first permutation information acquisition module A102 may acquire the first permutation information $\pi_A$ without being based on the random numbers. For example, the first permutation information acquisition module A102 may acquire only some elements of the first permutation information $\pi_A$ through use of the random numbers, and may use predetermined fixed values as the other elements. The first permutation information acquisition module A102 may acquire all the elements of the first permutation information $\pi_A$ without being based on the random numbers. The first permutation information $\pi_A$ may be stored in advance in the first data storage unit A100 instead of being generated on the spot. In this case, the first permutation information acquisition module A102 may refer to the first data storage unit A100 to acquire the first permutation information $\pi_A$.

For example, the second secret information acquisition module B101 acquires the second secret information "b" stored in the second data storage unit B100 (Step S12). The second secret information "b" is read out by the processing step of Step S12 to be loaded into a memory area of the nonvolatile memory. When the second secret information "b" has been loaded in the memory area in advance, the processing step of Step S12 is not required to be executed.

For example, the second permutation information acquisition module B102 acquires the second permutation information $\pi_B$ (Step S13). In Step S13, the second permutation information acquisition module B102 generates the second permutation information $\pi_B$ based on random numbers. For example, the second permutation information acquisition module B102 generates the same number of random numbers as the number "i" of elements, and uses the random numbers as the respective elements of the second permutation information NB. As an algorithm for generating the random numbers, it is possible to use a publicly known algorithm. For example, the random numbers may be generated based on a linear congruential method, a multiplicative congruential method, an M-sequence method, or the Mersenne twister method. The second device B can generate the random numbers based on any one of those methods when the random numbers are required in the subsequent processing.

The second permutation information acquisition module B102 may acquire the second permutation information $\pi_B$ without being based on the random numbers. For example, the second permutation information acquisition module B102 may acquire only some elements of the second permutation information $\pi_B$ through use of the random numbers, and may use predetermined fixed values as the other elements. The second permutation information acquisition module B102 may acquire all the elements of the second permutation information $\pi_B$ without being based on the random numbers. The second permutation information $\pi_B$ may be stored in advance in the second data storage unit B100 instead of being generated on the spot. In this case, the second permutation information acquisition module B102 may refer to the second data storage unit B100 to acquire the second permutation information NB.

For example, the first managed information acquisition module A103 acquires first managed information $<c>_A=<\pi_B (\pi_A (a))>_A$ managed by the first device A from among first permutation results $\pi_B (\pi_A (a))$ obtained as a result of permutating the first secret information "a" based on the first permutation information $\pi_A$ and the second permutation information $\pi_B$ and distributively managed by the first device A and the second device B (Step S20). In the at least one embodiment, a case in which the first permutation result $\pi_B (\pi_A (a))$ and the first managed information $<c>_A$ each have a vector format is described, but the first permutation result $\pi_B (\pi_A (a))$ and the first managed information $<c>_A$ may each be a plurality of numerical values, a matrix, an array, a vector, a data frame, or other information.

For example, the third managed information acquisition module B103 acquires third managed information $<c>_B=<\pi_B (\pi_A (a))>_B$ managed by the second device B from among the first permutation results $\pi_B (\pi_A (a))$ (Step S21). The processing steps of Step S20 and Step S21 are performed to cause the first device A and the second device B to share the first secret information "a" by the secret sharing through use of the permutation relating to the first permutation information $\pi_A$ and the second permutation information $\pi_B$, respectively.

FIG. 10 is a diagram for illustrating an example of details of the processing steps of Step S20 and Step S21. For example, the fifth managed information acquisition module A105 acquires fifth managed information $<S>_A$ managed by the first device A from among first distributed information S distributively managed by the first device A and the second device B (Step S200). The first distributed information S is information to be shared by the secret sharing. In the at least one embodiment, a case in which the first distributed information S is random numbers is described, but the first distributed information S may be any information, and is not limited to the random numbers. For example, the first distributed information S may be predetermined fixed values or may be current times.

A detailed example of the processing step of Step S200 is described later with reference to FIG. 11. In the same manner, a detailed example of the processing steps of from Step S201 to Step S203, which are described later, is also described with reference to FIG. 11. The processing for acquiring the fifth managed information $<S>_A$ is not limited to the example of FIG. 11. The fifth managed information acquisition module A105 may acquire the fifth managed information $<S>_A$ based on other secret sharing different from that illustrated in FIG. 11. As the other secret sharing itself, a publicly known method can be used, for example, a method such as Shamir's secret sharing or Blakley's secret sharing may be used. This point is also true for a case in which some information is shared in the following description.

For example, the first managed information acquisition module A103 acquires, as the first managed information $<\pi_B (\pi_A (a))>_A$, sixth managed information $<\pi_B(S)>_A$ managed by the first device A from among third permutation results $\pi_B(S)$ obtained as a result of permutating the first distributed information S based on the second permutation information $\pi_B$ and distributively managed by the first device A and the second device B (Step S201). The first device A and the second device B do not actually acquire the third permutation results $\pi_B(S)$, but acquire only shares of the third permutation results $\pi_B(S)$. For example, the seventh managed information acquisition module B105 acquires seventh managed information $<S>_B$ managed by the second device B from among the first distributed information S (Step S202). The eighth managed information acquisition module B106 acquires eighth managed information $<\pi_B(S)>_B$ managed by the second device B from among the third permutation results $\pi_B(S)$ (Step S203).

FIG. 11 is a diagram for illustrating an example of details of the processing steps of from Step S200 to Step S203. The processing steps of from Step S200 to Step S203 are executed through use of the secret sharing. In the at least one embodiment, a case of using the secret sharing as described in Wenjing Fang, Derun Zhao, Jin Tan, Chaochao Chen, Chaofan Yu, Li Wang, Lei Wang, Jun Zhou, Benyu Zhang, "Large-Scale Secure XGB for Vertical Federated Learning" is taken as an example. This method is also used for the processing steps of from Step S300 to Step S303 and the processing steps of from Step S304 to Step S307, which are described later. The processing steps of from Step S200 to Step S203, the processing steps of from Step S300 to Step S303, and the processing steps of from Step S304 to Step S307 may be executed through use of other secret sharing. Examples of the other secret sharing are as described above.

For example, the first key acquisition module A111 acquires a first public key PK1 and a first secret key SK1 (Step S2000). In the at least one embodiment, a case in which the first key acquisition module A111 acquires the first public key PK1 and the first secret key SK1 based on a method of a public key cryptosystem (including a method of a homomorphic public key cryptosystem method) is taken as an example. For example, as the public key cryptosystem, any one of various methods such as RSA, Paillier, DSA, or ECDSA may be used. Another cryptosystem different from the public key cryptosystem may also be used. For example, the first key acquisition module A111 may generate a key based on a method of a common key cryptosystem, a secret key cryptosystem, or a hybrid system. When encrypted communication is executed between the first device A and the second device B, any key in any one of various publicly known cryptosystems may be used.

For example, the first public key transmission module A112 transmits the first public key PK1 to the second device B (Step S2001). The first public key reception module B115 of the second device B receives the first public key PK1 from the first device A (Step S2002). As transfer itself of the first public key PK1, the method of the publicly known public key cryptosystem may be used.

For example, the fifth managed information acquisition module A105 acquires the fifth managed information $<S>_A$ based on second random numbers (Step S2003). In Step S2003, the fifth managed information acquisition module A105 generates the same number of second random numbers as the number "i" of elements, and acquires the second random numbers as the fifth managed information $<S>_A$. The fifth managed information acquisition module A105 may acquire the fifth managed information $<S>_A$ without being based on the second random numbers. For example, the fifth managed information acquisition module A105 may acquire the fifth managed information $<S>_A$ including a predetermined value, or may determine only some elements of the fifth managed information $<S>_A$ based on the second random numbers.

For example, the seventh managed information acquisition module B105 acquires the seventh managed information $<S>_B$ based on third random numbers (Step S2004). In Step S2004, the seventh managed information acquisition module B105 generates the same number of third random numbers as the number "i" of elements, and acquires the third random numbers as the seventh managed information $<S>_B$. The seventh managed information acquisition module B105 may acquire the seventh managed information $<S>_B$ without being based on the third random numbers. For example, the seventh managed information acquisition module B105 may acquire the seventh managed information $<S>_B$ including a predetermined value, or may determine only some elements of the seventh managed information $<S>_B$ based on the third random numbers.

For example, the eighth managed information acquisition module B106 acquires the eighth managed information $<\pi_B(S)>_B$ based on fourth random numbers (Step S2005). In Step S2005, the eighth managed information acquisition module B106 generates the same number of fourth random numbers as the number "i" of elements, and acquires the fourth random numbers as the eighth managed information $<\pi_B(S)>_B$. The eighth managed information acquisition module B106 may acquire the eighth managed information $<\pi_B (S)>_B$ without being based on the fourth random numbers. For example, the eighth managed information acquisition module B106 may acquire the eighth managed information $<\pi_B(S)>_B$ including a predetermined value, or may determine only some elements of the eighth managed information $<\pi_B(S)>_B$ based on the fourth random numbers.

For example, the fifth managed information transmission module A110 transmits the fifth managed information $<S>_A$ to the second device B (Step S2006). In Step S2006, the fifth managed information transmission module A110 encrypts the fifth managed information $<S>_A$ based on the first public key PK1, and transmits the encrypted fifth managed information $[<S>_A]$ to the second device B. In the at least one embodiment, encrypted information is enclosed by symbols "[" and "]". The fifth managed information transmission module A110 may execute the encryption based on the first secret key SK1. Further, when another cryptosystem different from the public key cryptosystem is used, the fifth managed information transmission module A110 may transmit, to the second device B, the fifth managed information $[<S>_A]$ encrypted by the other cryptosystem. For example, when the encrypted communication is not used, the fifth managed information transmission module A110 may transmit the fifth managed information $<S>_A$ in plaintext to the second device B.

For example, the fifth managed information reception module B111 receives the fifth managed information $<S>_A$ from the first device A (Step S2007). In Step S2007, the fifth managed information reception module B111 of the second device B receives the encrypted fifth managed information $[<S>_A]$ from the first device A. When another cryptosystem different from the public key cryptosystem is used, the fifth managed information reception module B111 receives the fifth managed information $[<S>_A]$ encrypted by the other cryptosystem. Further, when the fifth managed information $<S>_A$ is transmitted in plaintext, the fifth managed information reception module B111 receives the fifth managed information $<S>_A$ in plaintext.

For example, the third permutation result acquisition module B112 acquires the third permutation result NB(S)= $<S>_A+<S>_B$ based on the fifth managed information $<S>_A$ and the seventh managed information $<S>_B$ (Step S2008). The third permutation result acquisition module B112 may acquire the third permutation result $\pi_B$(S) based on not addition but subtraction, multiplication, division, or another formula. In Step S2008, the third permutation result acquisition module B112 encrypts the seventh managed information $<S>_B$ based on the first public key PK1, and acquires the encrypted third permutation result $[\pi_B(S)]=[<S>_A]+[<S>_B]$ based on the encrypted fifth managed information $[<S>_A]$ and the encrypted seventh managed information $[<S>_B]$.

For example, the sixth managed information acquisition module B113 acquires the sixth managed information $<\pi_B$ (S)$>_A=\pi_B$(S)$-<\pi_B$(S)$>_B$ based on the third permutation result Is(S) and the eighth managed information $<\pi_B$(S)$>_B$ (Step S2009). The sixth managed information acquisition module B113 may acquire the sixth managed information $<\pi_B$(S)$>_A$ based on not subtraction but addition, multiplication, division, or another formula. In Step S2009, the sixth managed information acquisition module B113 encrypts the eighth managed information $<\pi_B$(S)$>_B$ based on the first public key PK1, and acquires the encrypted sixth managed information $[<\pi_B$(S)$>_A]=[\pi_B$(S)]$-[<\pi_B$(S)$>_B]$ based on the encrypted third permutation result $[\pi_B$(S)] and the encrypted eighth managed information $[<\pi_B$(S)$>_B]$. The sixth managed information acquisition module B113 may encrypt the eighth managed information $<\pi_B$(S)$>_B$ based on another cryptosystem different from the public key cryptosystem. Further, when the encrypted communication is not used, the sixth managed information acquisition module B113 is not required to execute the encryption of the eighth managed information $<\pi_B$(S)$>_B$.

For example, the sixth managed information transmission module B114 transmits the sixth managed information $<\pi_B$ (S)$>_A$ to the first device A (Step S2010). In Step S2010, the sixth managed information transmission module B114 transmits the encrypted sixth managed information $[<\pi_B$(S)$>_A]$ to the first device A. When the encrypted communication is not used, the sixth managed information transmission module B114 is not required to execute the encryption of the sixth managed information $<\pi_B$(S)$>_A$ in plaintext.

For example, the first managed information acquisition module A103 receives the sixth managed information $<\pi_B$ (S)$>_A$ from the second device B, and acquires the sixth managed information $<\pi_B$(S)$>_A$ as the first managed information $<\pi_B$ $(\pi_A$ (a))$>_A$ (Step S2011). In Step S2011, the first managed information acquisition module A103 receives the encrypted sixth managed information $[<\pi_B$(S)$>_A]$ from the second device B, decrypts the received sixth managed information $[<\pi_B$(S)$>_A]$ by the first secret key SK1, and acquires the decrypted sixth managed information $[<\pi_B$(S) $>_A]$ as the first managed information $<\pi_B$ $(\pi_A$ (a))$>_A$. The first managed information acquisition module A103 may decrypt the encrypted sixth managed information $[<\pi_B$(S)$>_A]$ based on another cryptosystem different from the public key cryptosystem. Further, when the encrypted communication is not used, the first managed information acquisition module A103 is not required to execute the decryption. The processing steps of from Step S2000 to Step S2011, which have been described above, are the details of the processing steps of from Step S200 to Step S203.

Referring back to FIG. 10, for example, the first public information acquisition module B107 acquires first public information "r" to be disclosed to the first device A as ninth managed information $<\pi_A$ (a)>3 managed by the second device B among fourth permutation results IA (a) obtained as a result of permutating the first secret information "a" based on the first permutation information $\pi_A$ and distributively managed by the first device A and the second device B (Step S204). In Step S204, the first public information acquisition module B107 of the second device B acquires the first public information "r" based on first random numbers. The first public information acquisition module B107 generates the same number of first random numbers as the number "i" of elements based on any random number generation algorithm exemplified in the at least one embodiment, and acquires the first random numbers as the first public information "r". The first public information acquisition module B107 may acquire a predetermined fixed value as the first public information "r" in place of the first random numbers, or may acquire the current date and time as the first public information "r".

For example, the first public information transmission module B108 transmits the first public information "r" to the first device A (Step S205). In the at least one embodiment, a case in which the first public information transmission module B108 transmits, to the first device A, the first public information "r" that has been encrypted based on a predetermined encryption algorithm is taken as an example, but the first public information transmission module B108 may transmit, to the first device A, the first public information "r" in plaintext without encryption thereof.

For example, the first public information reception module A106 receives the first public information "r" from the second device B (Step S206). In the at least one embodiment, the first public information "r" has been encrypted, and hence the first public information reception module A106 decrypts the first public information "r" received from the second device B. When the first public information "r" is transmitted in plaintext, the first public information reception module A106 does not perform the decryption.

For example, the tenth managed information acquisition module A107 acquires tenth managed information $<\pi_A$ (a)$>_A$ managed by the first device A from among the fourth permutation results IA (a) based on the first public information "r" (Step S207). In Step S207, the tenth managed information acquisition module A107 acquires a difference between the fourth permutation results NA (a) and the first public information "r" as the tenth managed information $<\pi_A$ (a)$>_A=\pi_A$ (a)$-r$. The tenth managed information acquisition module A107 may acquire the tenth managed information $<\pi_A$ (a)$>_A$ based on not subtraction but addition, multiplication, division, or another formula.

For example, the second public information acquisition module A108 acquires second public information $<\pi_A$ (a)$>_A-<S>_A$ to be disclosed to the second device B based on the tenth managed information $<\pi_A$ (a)$>_A$ and the fifth managed information $<S>_A$ (Step S208). The second public information acquisition module A108 may acquire the second public information based on not subtraction but addition, multiplication, division, or another formula.

For example, the second public information transmission module A109 transmits the second public information $<\pi_A$ (a)$>_A-<S>_A$ to the second device B (Step S209). In the at least one embodiment, a case in which the second public information transmission module A109 transmits, to the second device B, the second public information $<\pi_A$ (a)$>_A-$ $<S>_A$ that has been encrypted based on a predetermined encryption algorithm is taken as an example, but the second public information transmission module A109 may transmit, to the second device B, the second public information $<\pi_A (a)>_A-<S>_A$ in plaintext without encryption thereof.

For example, the second public information reception module B109 receives the second public information $<\pi_A (a)>_A-<S>_A$ from the first device A (Step S210). In the at least one embodiment, the second public information $<\pi_A (a)>_A-<S>_A$ has been encrypted, and hence the second public information reception module B109 decrypts the second public information $<\pi_A (a)>_A-<S>_A$ received from the first device A. When the second public information $<\pi_A (a)>_A-<S>_A$ is transmitted in plaintext, the second public information reception module B109 does not perform the decryption.

For example, the first computation information acquisition module B110 acquires first computation information $\pi_A (a)-S=<\pi_A (a)>_A-<S>_A+<\pi_A (a)>_B-<S>_B$ based on the managed seventh information $<S>_B$, the ninth managed information $<\pi_A (a)>_B$, and the second public information $<\pi_A (a)>_A-<S>_A$ (Step S211). The first computation information acquisition module B110 is only required to execute the computation of Step S211 based on a predetermined formula, and may execute the computation of Step S211 based on another formula.

For example, the third managed information acquisition module B103 of the second device B acquires the third managed information $<\pi_B(\pi_A(a))>_B=\pi_B(\pi_A(a)-S)+<\pi_B (S)>_B$ based on the eighth managed information $<\pi_B(S)>_B$ and fifth permutation results $\pi_B (\pi_A (a)-S)$ obtained as a result of permutating the first computation information $\pi_A (a)-S$ based on the second permutation information $\pi_B$ (Step S212). The third managed information acquisition module B103 is only required to execute the computation of Step S212 based on a predetermined formula, and may execute the computation of Step S212 based on another formula. The processing steps of from Step S200 to Step S212, which have been described above, are the details of the processing steps of Step S20 and Step S21.

Referring back to FIG. 9, for example, the second managed information acquisition module A104 acquires second managed information $<d>_A=<\pi_B (\pi_A (b))>_A$ managed by the first device A from among second permutation results $\pi_B (\pi_A (b))$ obtained as a result of permutating the second secret information "b" based on the first permutation information $\pi_A$ and the second permutation information $\pi_B$ and distributively managed by the first device A and the second device B (Step S30). In the at least one embodiment, a case in which the second permutation result $\pi_B (\pi_A (b))$ and the second managed information $<d>_A$ each have a vector format is described, but the second permutation result $\pi_B (\pi_A (b))$ and the second managed information $<d>_A$ may each be a plurality of numerical values, a matrix, a vector, a data frame, or other information.

For example, the fourth managed information acquisition module B104 acquires fourth managed information $<d>_B=<\pi_B (\pi_A (b))>_B$ managed by the second device B from among the second permutation results $\pi_B (\pi_A (b))$ (Step S31). The processing steps of Step S30 and Step S31 are performed to cause the first device A and the second device B to share the second secret information "b" by the secret sharing through use of the permutation relating to the first permutation information $\pi_A$ and the second permutation information $\pi_B$, respectively.

Figure 12:
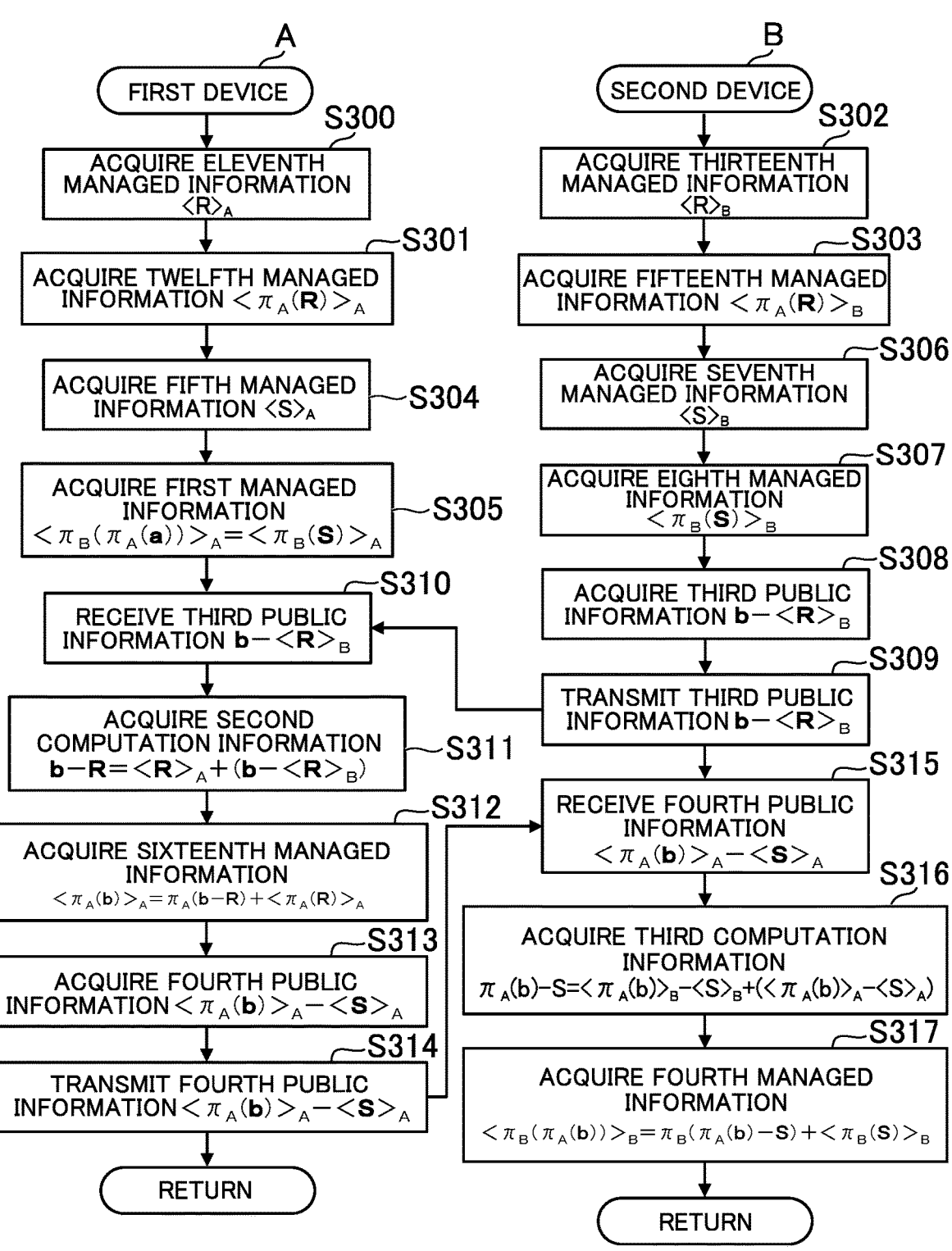
FIG. 12 is a diagram for illustrating an example of details of processing steps of Step S30 and Step S31.

FIG. 12 is a diagram for illustrating an example of details of the processing steps of Step S30 and Step S31. For example, the eleventh managed information acquisition module A113 acquires eleventh managed information $<R>_A$ managed by the first device A from among second distributed information R distributively managed by the first device A and the second device B (Step S300). The second distributed information R is information to be shared by the secret sharing. In the at least one embodiment, a case in which the second distributed information R is random numbers is described, but the second distributed information R may be any information, and is not limited to the random numbers. For example, the second distributed information R may be predetermined fixed values or may be current times.

A detailed example of the processing step of Step S300 is described later with reference to FIG. 13. In the same manner, a detailed example of the processing steps of from Step S301 to Step S303, which are described later, is also described with reference to FIG. 13. The processing for acquiring the eleventh managed information $<R>_A$ is not limited to the example of FIG. 13. The eleventh managed information acquisition module A113 may acquire the eleventh managed information $<R>_A$ based on other secret sharing different from that illustrated in FIG. 13. As the other secret sharing itself, a publicly known method can be used, for example, a method such as Shamir's secret sharing or Blakley's secret sharing may be used. This point is also true for a case in which some information is shared in the following description.

For example, the twelfth managed information acquisition module A114 acquires twelfth managed information $<IA (R)>_A$ managed by the first device A from among sixth permutation results $\pi_A (R)$ obtained as a result of permutating the second distributed information R based on the first permutation information $\pi_A$ and distributively managed by the first device A and the second device B (Step S301). The first device A and the second device B do not actually acquire the sixth permutation results $\pi_A (R)$, but acquire only shares of the sixth permutation results $\pi_A (R)$.

For example, the thirteenth managed information acquisition module B116 acquires thirteenth managed information $<R>_B$ managed by the second device B from among the second distributed information R (Step S302). The fourteenth managed information acquisition module B117 acquires fifteenth managed information $<\pi_A (R)>_B$ managed by the second device B from among the sixth permutation results NA (R) as the fourteenth managed information $<\pi_A (b)>$: managed by the second device B among seventh permutation results $\pi_A (b)$ obtained as a result of permutating the second secret information "b" based on the first permutation information $\pi_A$ and distributively managed by the first device A and the second device B (Step S303).

Figure 13:
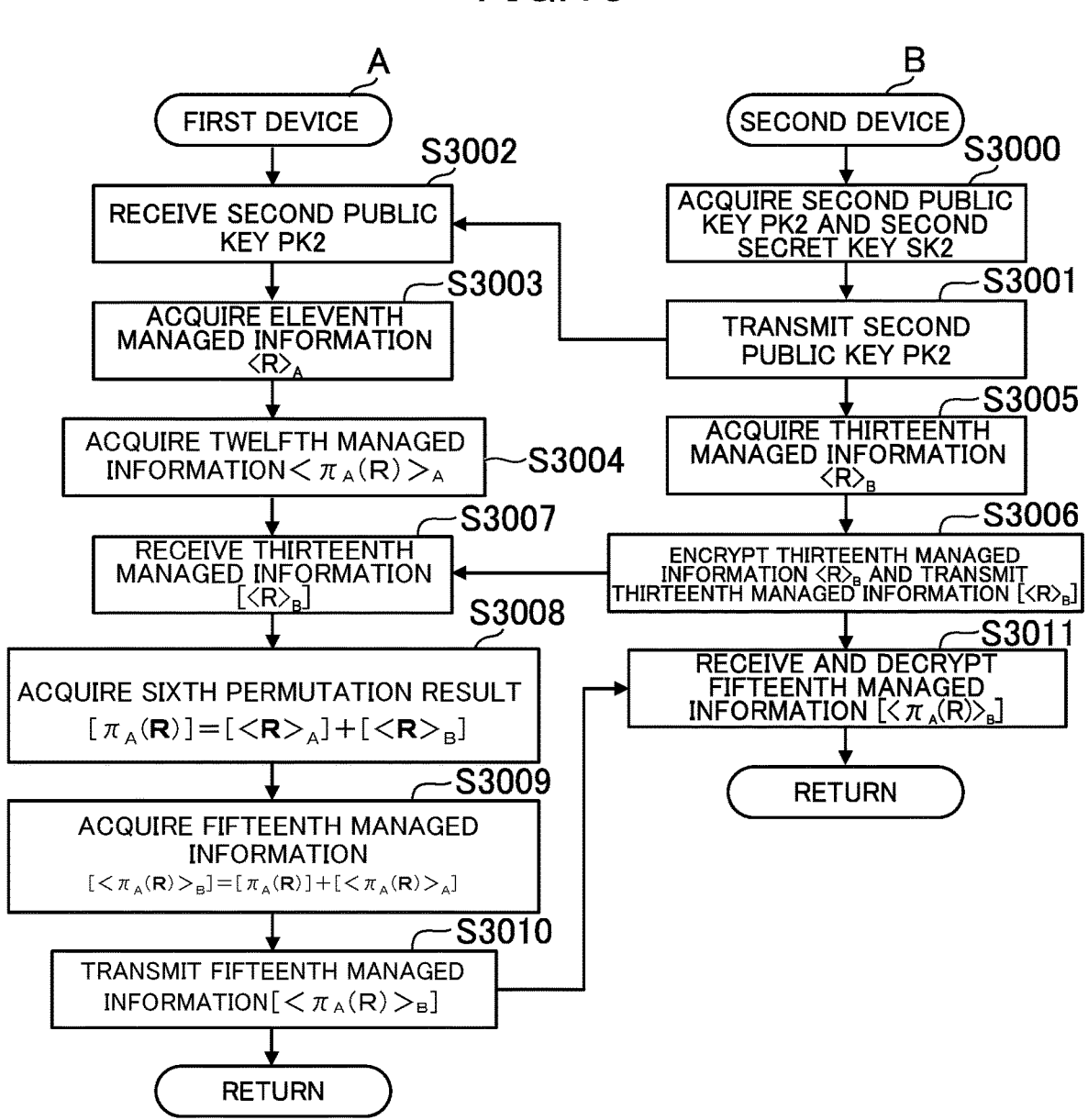
FIG. 13 is a diagram for illustrating an example of details of processing steps of from Step S300 to Step S303.

FIG. 13 is a diagram for illustrating an example of details of the processing steps of from Step S300 to Step S303. The second key acquisition module B122 acquires a second public key PK2 and a second secret key SK2 (Step S3000). In the at least one embodiment, a case in which the second key acquisition module B122 acquires the second public key PK2 and the second secret key SK2 based on a method of a publicly known public key cryptosystem is taken as an example, but the keys themselves generated by the second key acquisition module B122 may each be any one of various publicly known keys. For example, the second key acquisition module B122 may generate the keys based on a method of a common key cryptosystem. When the encrypted communication is executed between the first device A and the second device B, any key in any one of various publicly known cryptosystems may be used.

For example, the second public key transmission module B123 transmits the second public key PK2 to the first device A (Step S3001). The second public key reception module A124 of the first device A receives the second public key PK2 from the second device B (Step S3002). As transfer itself of the second public key PK2, the method of the publicly known public key cryptosystem may be used.

For example, the eleventh managed information acquisition module A113 acquires the eleventh managed information $<R>_A$ based on fifth random numbers (Step S3003). In Step S3003, the eleventh managed information acquisition module A113 generates the same number of fifth random numbers as the number "i" of elements, and acquires the fifth random numbers as the eleventh managed information $<R>_A$. The eleventh managed information acquisition module A113 may acquire the eleventh managed information $<R>_A$ without being based on the fifth random numbers. For example, the eleventh managed information acquisition module A113 may acquire the eleventh managed information $<R>_A$ including a predetermined value, or may determine only some elements of the eleventh managed information $<R>_A$ based on the fifth random numbers.

For example, the twelfth managed information acquisition module A114 acquires the twelfth managed information $<\pi_A (R)>_A$ based on sixth random numbers (Step S3004). In Step S3004, the twelfth managed information acquisition module A114 generates the same number of sixth random numbers as the number "i" of elements, and acquires the sixth random numbers as the twelfth managed information $<\pi_A (R)>_A$. The twelfth managed information acquisition module A114 may acquire the twelfth managed information $<\pi_A (R)>_A$ without being based on the sixth random numbers. For example, the twelfth managed information acquisition module A114 may acquire the twelfth managed information $<\pi_A (R)>_A$ including a predetermined value, or may determine only some elements of the seventh managed information $<S>$: based on the sixth random numbers.

For example, the thirteenth managed information acquisition module B116 acquires the thirteenth managed information $<R>_B$ based on seventh random numbers (Step S3005). In Step S3005, the thirteenth managed information acquisition module B116 generates the same number of seventh random numbers as the number "i" of elements, and acquires the seventh random numbers as the thirteenth managed information $<R>_B$. The thirteenth managed information acquisition module B116 may acquire the thirteenth managed information $<R>_B$ without being based on the seventh random numbers. For example, the thirteenth managed information acquisition module B116 may acquire the thirteenth managed information $<R>_B$ including a predetermined value, or may determine only some elements of the thirteenth managed information $<R>_B$ based on the seventh random numbers. For example, the thirteenth managed information transmission module transmits the thirteenth managed information $<R>_B$ to the first device A (Step S3006). In Step S3006, the thirteenth managed information transmission module of the second device B encrypts the thirteenth managed information $<R>_B$ based on the second public key PK2, and transmits the encrypted thirteenth managed information $[<R>_B]$ to the first device A. The thirteenth managed information transmission module may execute the encryption based on the first secret key SK1. Further, when another cryptosystem different from the public key cryptosystem is used, the thirteenth managed information transmission module may transmit, to the first device A, the thirteenth managed information $[<R>_B]$ encrypted by the other cryptosystem. For example, when the encrypted communication is not used, the thirteenth managed information transmission module may transmit the thirteenth managed information $<R>_B$ in plaintext to the first device A.

For example, the thirteenth managed information reception module A120 receives the thirteenth managed information $<R>_B$ from the second device B (Step S3007). In Step S3007, the thirteenth managed information reception module A120 receives the encrypted thirteenth managed information $[<R>_B]$ from the second device B. When another cryptosystem different from the public key cryptosystem is used, the thirteenth managed information reception module A120 receives the thirteenth managed information $[<R>_B]$ encrypted by the other cryptosystem. Further, when the thirteenth managed information $<R>_B$ is transmitted in plaintext, the thirteenth managed information reception module A120 receives the thirteenth managed information $<R>_B$ in plaintext.

For example, the sixth permutation result acquisition module A121 acquires the sixth permutation result $\pi_A (R)=<R>_A+<R>_B$ based on the eleventh managed information $<R>_A$ and the thirteenth managed information $<R>_B$ (Step S3008). The sixth permutation result acquisition module A121 may acquire the sixth permutation result $\pi_A (R)$ based on not addition but subtraction, multiplication, division, or another formula. In Step S3008, the sixth permutation result acquisition module A121 encrypts the eleventh managed information $<R>_A$ based on the second public key PK2, and acquires the encrypted sixth permutation result $[\pi_A (R)]=[<R>_A]+[<R>_B]$ based on the encrypted thirteenth managed information $[<R>_B]$ and the encrypted eleventh managed information $[<R>_A]$.

For example, the fifteenth managed information acquisition module A122 acquires the fifteenth managed information $<\pi_A (R)>_B=\pi_A (R)-<\pi_A (R)>_A$ based on the sixth permutation result $\pi_A (R)$ and the twelfth managed information $<\pi_A (R)>_A$ (Step S3009). The fifteenth managed information acquisition module A122 may acquire the fifteenth managed information $<\pi_A (R)>_B$ based on not subtraction but addition, multiplication, division, or another formula. In Step S3009, the fifteenth managed information acquisition module A122 encrypts the twelfth managed information $<\pi_A (R)>_A$ based on the second public key PK2, and acquires the encrypted fifteenth managed information $[<\pi_A (R)>_B]=[\pi_A (R)]+[<\pi_A (R)>_A]$ based on the encrypted sixth permutation result $[\pi_A (R)]$ and the encrypted twelfth managed information $[<\pi_A (R)>_A]$. The fifteenth managed information acquisition module A122 may encrypt the twelfth managed information $<\pi_A (R)>_A$ based on another cryptosystem different from the public key cryptosystem. Further, when the encrypted communication is not used, the fifteenth managed information acquisition module A122 is not required to execute the encryption of the twelfth managed information $<\pi_A (R)>_A$.

For example, the fifteenth managed information transmission module A123 transmits the fifteenth managed information $<\pi_A (R)>_B$ to the second device B (Step S3010). In Step S3010, the fifteenth managed information transmission module A123 transmits the encrypted fifteenth managed information $[<\pi_A (R)>_B]$ to the second device B. When the encrypted communication is not used, the fifteenth managed information transmission module A123 is not required to execute the encryption of the fifteenth managed information $<\pi_A (R)>_B$ in plaintext.

For example, the fourteenth managed information acquisition module B117 of the second device B receives the fifteenth managed information $<\pi_A (R)>8$ from the first device A, and acquires the fifteenth managed information $<\pi_A (R)>_B$ as the fourteenth managed information $<\pi_A (b)>_B$ (Step S3011). In Step S3011, the fourteenth managed information acquisition module B117 of the second device B receives the encrypted fifteenth managed information [$<\pi_A(R)>_B$] from the first device A, decrypts the received fifteenth managed information [$<\pi_A(R)>_B$] by the second secret key SK2, and acquires the decrypted fifteenth managed information [$<\pi_A(R)>_B$] as the fourteenth managed information $<\pi_A(b)>_B$. The fourteenth managed information acquisition module B117 may decrypt the encrypted fifteenth managed information [$<\pi_A(R)>_B$] based on another cryptosystem different from the public key cryptosystem. Further, when the encrypted communication is not used, the fourteenth managed information acquisition module B117 is not required to execute the decryption. The processing steps of from Step S3000 to Step S3011, which have been described above, are the details of the processing steps of from Step S300 to Step S303.

Referring back to FIG. 12, the processing steps of from Step S304 to Step S307 are the same as the processing steps of from Step S200 to Step S203. The processing steps of from Step S200 to Step S203 have already been executed, and hence the processing steps of from Step S304 to Step S307 may be omitted. In Step S304, the second managed information acquisition module A104 acquires, as the second managed information $<\pi_B(NA(b))>_A$/the sixth managed information $<\pi_B(S)>_A$ managed by the first device A from among the third permutation results $\pi_B(S)$ obtained as a result of permutating the first distributed information S based on the second permutation information $\pi_B$ and distributively managed by the first device A and the second device B.

For example, the third public information acquisition module B118 acquires third public information b–$<R>_B$ to be disclosed to the first device A based on the second secret information "b" and the thirteenth managed information $<R>_B$ (Step S308). The third public information acquisition module B118 may acquire the third public information based on not subtraction but addition, multiplication, division, or another formula.

For example, the third public information transmission module B119 transmits the third public information b–$<R>_B$ to the first device A (Step S309). In the at least one embodiment, a case in which the third public information transmission module B119 transmits, to the first device A, the third public information b–$<R>_B$ that has been encrypted based on a predetermined encryption algorithm is taken as an example, but the third public information transmission module B119 may transmit, to the first device A, the third public information b–$<R>_B$ in plaintext without encryption thereof.

For example, the third public information reception module A115 receives the third public information b–$<R>_B$ from the second device B (Step S310). In the at least one embodiment, the third public information b–$<R>$: has been encrypted, and hence the third public information reception module A115 decrypts the third public information b–$<R>_B$ received from the second device B. When the third public information b–$<R>_B$ is transmitted in plaintext, the third public information reception module A115 does not perform the decryption.

For example, the computation information second acquisition module A116 acquires second computation information b–R=$<R>_A$+(b–$<R>_B$) based on the eleventh managed information $<R>_A$ and the third public information b–$<R>_B$ (Step S311). The second computation information acquisition module A116 may execute the processing step of Step S311 based on not addition but subtraction, multiplication, division, or another formula.

For example, the sixteenth managed information acquisition module A117 acquires sixteenth managed information $<\pi_A(b)>_A=\pi_A(b-R)+<\pi_A(R)>_A$ managed by the first device A from among the seventh permutation results IA (b) based on the twelfth managed information $<\pi_A(R)>_A$ and an eighth permutation result $\pi_A(b-R)$ obtained by permutating the second computation information b-R based on the first permutation information $\pi_A$ (Step S312). The sixteenth managed information acquisition module A117 may execute the processing step of Step S312 based on not addition but subtraction, multiplication, division, or another formula. For example, the fourth public information acquisition module A118 acquires fourth public information $<\pi_A(b)>_A$–$<S>_A$ to be disclosed to the second device B based on the sixteenth managed information $<\pi_A(b)>_A$ and the fifth managed information $<S>_A$ (Step S313). The fourth public information acquisition module A118 may acquire the fourth public information based on not subtraction but addition, multiplication, division, or another formula.

For example, the fourth public information transmission module A119 transmits the fourth public information $<\pi_A(b)>_A$–$<S>_A$ to the second device B (Step S314). In the at least one embodiment, a case in which the fourth public information transmission module A119 transmits, to the second device B, the fourth public information $<\pi_A(b)>_A$–$<S>_A$ that has been encrypted based on a predetermined encryption algorithm is taken as an example, but the fourth public information transmission module A119 may transmit, to the second device B, the fourth public information $<\pi_A(b)>_A$–$<S>_A$ in plaintext without encryption thereof.

For example, the fourth public information reception module B120 receives the fourth public information $<\pi_A(b)>_A$–$<S>_A$ from the first device A (Step S315). In the at least one embodiment, the fourth public information $<\pi_A(b)>_A$–$<S>_A$ has been encrypted, and hence the fourth public information reception module B120 decrypts the fourth public information $<\pi_A(b)>_A$–$<S>_A$ received from the first device A. When the fourth public information $<\pi_A(b)>_A$–$<S>_A$ is transmitted in plaintext, the fourth public information reception module B120 does not perform the decryption.

For example, the third computation information acquisition module B121 acquires third computation information $\pi_A(b)$–S=$<\pi_A(b)>_B$–$<S>_B$+($<\pi_A(b)>_A$–$<S>_A$) based on the fourteenth managed information $<\pi_A(b)>_B$, the seventh managed information $<S>_B$, and the fourth public information $<\pi_A(b)>_A$–$<S>_A$ (Step S316). The third computation information acquisition module B121 is only required to execute the computation of Step S316 based on a predetermined formula, and may execute the computation of Step S316 based on another formula.

For example, the fourth managed information acquisition module B104 of the second device B acquires the fourth managed information $<\pi_B(\pi_A(b))>_B=\pi_B(\pi_A(b)-S)+<\pi_B(S)>_B$ based on the eighth managed information $<\pi_B(S)>3$ and a ninth permutation result $\pi_B(\pi_A(b)-S)$ obtained by permutating the third computation information $\pi_A(b)$–S based on the second permutation information $\pi_B$ (Step S317). The fourth managed information acquisition module B104 is only required to execute the computation of Step S317 based on a predetermined formula, and may execute the computation of Step S317 based on another formula. The processing steps of from Step S300 to Step S317, which have been described above, are the details of the processing steps of Step S30 and Step S31.

Referring back to FIG. 9, for example, the first managed product acquisition module A125 acquires first managed products $<e_i>_A$ managed by the first device A based on the first managed information $<c>_A$ and the second managed information $<d>_A$ from among distributed products $e_i = c_i d_i$ being products of the first permutation results $\pi_B (\pi_A (a))$ and the second permutation results $\pi_B (\pi_A (b))$ and distributively managed by the first device A and the second device B (Step S40). In Step S40, the first managed product acquisition module A125 acquires the first managed products $<e_i>_A$ based on a method of Beaver multiplication triples (BMT). The first managed product acquisition module A125 may acquire the first managed products $<e_i>_A$ based on other secure computation different from the BMT.

For example, the second managed product acquisition module B124 acquires second managed products $<e_i>$: managed by the second device B from among the distributed products $e_i = c_i d_i$ based on the third managed information $<c>_B$ and the fourth managed information $<d>_B$ (Step S41). In Step S41, the second managed product acquisition module B124 acquires the second managed products $<e_i>_B$ based on the method of the BMT. The second managed product acquisition module B124 may acquire the second managed products $<e_i>_B$ based on other secure computation different from the BMT. The secure computation is a technology for a device to perform computation without disclosing information. Examples that may be used as the secure computation include the secret sharing, multi-party computation (MPC), homomorphic encryption, reversible secure computation, and a trusted execution environment (TEE).

For example, the first sum acquisition module A126 acquires a first sum $\Sigma_i <e_i>_A$ being a sum of the first managed products $<e_i>_A$ (Step S42). The second sum acquisition module B125 acquires a second sum $\Sigma_i <e_i>_B$ being a sum of elements of the second managed products $<e_i>_B$ (Step S43). The second sum transmission module B126 transmits the second sum $\Sigma_i <e_i>_B$ to the first device A (Step S44). In the at least one embodiment, a case in which the second sum transmission module B126 transmits, to the first device A, the second sum $\Sigma_i <e_i>_B$ that has been encrypted based on a predetermined encryption algorithm is taken as an example, but the second sum transmission module B126 may transmit, to the first device A, the second sum $\Sigma_i <e_i>_B$ in plaintext without encryption thereof.

For example, the second sum reception module A127 receives the second sum $\Sigma_i <e_i>_B$ from the second device B (Step S45). In the at least one embodiment, the second sum $\Sigma_i <e_i>_B$ has been encrypted, and hence the second sum reception module A127 decrypts the second sum $\Sigma_i <e_i>_B$ received from the second device B. When the second sum $\Sigma_i <e_i>_B$ is transmitted in plaintext, the second sum reception module A127 does not perform the decryption.

The secret product computing module A128 computes a secret product $\Sigma_i a_i b_i = \Sigma_i c_i d_i = \Sigma_i e_i = \Sigma_i <e_i>_A + \Sigma_i <e_i>_B$ based on the first sum $\Sigma_i <e_i>_A$ and the second sum $\Sigma_i <e_i>_B$ (Step S46), and this processing is ended. In the at least one embodiment, a case in which the secret product $\Sigma_i a_i b_i$ is an inner product is described, but it suffices that the secret product $\Sigma_i a_i b_i$ is information indicating some product. In the above-mentioned manner, in the computing system 10, the secret product $\Sigma_i a_i b_i = \Sigma_i c_i d_i = \Sigma_i e_i = \Sigma_i <e_i>_A + \Sigma_i <e_i>_B$ being the product of the first secret information "a" and the second secret information "b" is computed based on the first managed information $<c>_A$, the second managed information $<d>_A$, the third managed information $<c>_B$, and the fourth managed information $<d>_B$. That is, in the computing system 10, the secret product $\Sigma_i a_i b_i$ is computed based on the first sum $\Sigma_i <e_i>_A$ and the second sum $\Sigma_i <e_i>_B$.

For example, in the computing system 10, the training of the learning model M in the federated learning is executed based on the secret product $\Sigma_i a_i b_i$. For example, the learning model M may be a model in stacking learning for executing predetermined estimation based on an estimation result of each of a plurality of other learning models. In the at least one embodiment, the second device B executes the training of the second learning model BM based on the secret product $\Sigma_i a_i b_i$. For example, the second device B executes the training of the second learning model BM based on the formulae shown in FIG. 2.

4. Summary of at Least One Embodiment

The first device A in the at least one embodiment acquires the first managed information $<c>_A = <\pi_B (\pi_A (a))>_A$ managed by the first device A from among the first permutation results $\pi_B (\pi_A (a))$ distributively managed by the first device A and the second device B. The first device A acquires the second managed information $<d>_A = <\pi_B (\pi_A (b))>_A$ managed by the first device A from among the second permutation results $\pi_B (\pi_A (b))$ distributively managed by the first device A and the second device B. The second device B acquires the third managed information $<c>_B = <\pi_B (\pi_A (a))>_B$ managed by the second device B from among the first permutation results $\pi_B (\pi_A (a))$. The second device B acquires the fourth managed information $<d>_B = <\pi_B (\pi_A (b))>3$ managed by the second device B from among the second permutation results $\pi_B (\pi_A (b))$. In the computing system 10, the secret product $\Sigma_i a_i b_i$ being the product of the first secret information "a" and the second secret information "b" is computed based on the first managed information $<c>_A$, the second managed information $<d>_A$, the third managed information $<c>_B$, and the fourth managed information $<d>_B$. Thus, the first secret information "a" securely managed by the first device A and the second secret information "b" securely managed by the second device B are not directly transmitted, and hence security in computing the secret product $\Sigma_i a_i b_i$ is enhanced. Even when a third party acquires information exchanged between the first device A and the second device B, the third party cannot identify the first secret information "a" and the second secret information "b", and hence it is possible to reduce a risk that the first secret information "a" and the second secret information "b" may leak to the third party. In particular, a novel configuration such as the permutation of the elements is provided, thereby further enhancing security than in the case of the related-art secret sharing.

Further, the first device A acquires the fifth managed information $<S>_A$ managed by the first device A from among the first distributed information S distributively managed by the first device A and the second device B. The first device A acquires, as the first managed information $<\pi_B (\pi_A (a))>_A$, the sixth managed information $<\pi_B(S)>_A$ managed by the first device A from among the third permutation results Is(S) distributively managed by the first device A and the second device B. The second device B acquires the seventh managed information $<S>_B$ managed by the second device B from among the first distributed information S. The second device B acquires the eighth managed information $<\pi_B(S)>_B$ managed by the second device B from among the third permutation results $\pi_B(S)$. The second device B acquires the first public information "r" to be disclosed to the first device A as the ninth managed information $<\pi_A (a)>_B$ managed by the second device B among the fourth permutation results $\pi_A (a)$ distributively managed by the first device A and the second device B. The second device B transmits the first public information "r" to the first device A. The first device A receives the first public information "r" from the second device B. The first device A acquires the tenth managed information $<\pi_A \, (a)>_A$ managed by the first device A from among the fourth permutation results NA (a) based on the first public information "r". The first device A acquires the second public information $<\pi_A \, (a)>_A-<S>_A$ to be disclosed to the second device B based on the tenth managed information $<\pi_A \, (a)>_A$ and the fifth managed information $<S>_A$. The first device A transmits the second public information $<\pi_A \, (a)>_A-<S>_A$ to the second device B. The second device B receives the second public information $<\pi_A \, (a)>_A-<S>_A$ from the first device A. The second device B acquires the first computation information $\pi_A \, (a)-S=<\pi_A \, (a)>_A-<S>_A+ <\pi_A \, (a)>_B-<S>$ based on the seventh managed information $<S>_B$, the ninth managed information $<\pi_A \, (a)>_B$, and the second public information $<\pi_A \, (a)>_A-<S>_A$. The second device B acquires the third managed information $<\pi_B \, (\pi_A \, (a))>$: based on the eighth managed information $<\pi_B(S)>_B$ and the fifth permutation results $\pi_B \, (\pi_A \, (a)-S)$ obtained by permutating the first computation information $\pi_A \, (a)-S$ based on the second permutation information $\pi_B$. Thus, the first secret information "a" can be shared by the first device A and the second device B through use of the permutation based on the first permutation information $\pi_A$ and the second permutation information $\pi_B$, and hence the security is enhanced compared to the related-art method that does not use the permutation.

Further, the second device B acquires the first public information "r" based on the first random numbers. Thus, even when a third party acquires the first public information "r" being transmitted over the network N, the first secret information "a" and the second secret information "b" cannot be identified only with the acquired information, and hence it is possible to reduce a risk that the first secret information "a" and the second secret information "b" may leak to the third party.

Further, the first device A transmits the fifth managed information $<S>_A$ to the second device B. The second device B receives the fifth managed information $<S>_A$ from the first device A. The second device B acquires the third permutation result $\pi_B(S)$ based on the fifth managed information $<S>_A$ and the seventh managed information $<S>_B$. The second device B acquires the sixth managed information $<\pi_B(S)>_A$ based on the third permutation result Is(S) and the eighth managed information $<\pi_B(S)>_B$. The second device B transmits the sixth managed information $<\pi_B(S)>_A$ to the first device A. The first device A receives the sixth managed information $<\pi_B(S)>_A$ from the second device B, and acquires the sixth managed information $<\pi_B(S)>_A$ as the first managed information $<\pi_B \, (\pi_A \, (a))>_A$. Thus, even when a third party acquires the fifth managed information $<S>_A$ and the sixth managed information $<\pi_B(S)>_A$ that are being transmitted over the network N, the first secret information "a" and the second secret information "b" cannot be identified only with the acquired information, and hence it is possible to reduce the risk that the first secret information "a" and the second secret information "b" may leak to the third party.

Further, the first device A acquires the fifth managed information $<S>_A$ based on the second random numbers. The second device B acquires the seventh managed information $<S>_B$ based on the third random numbers. The second device B acquires the eighth managed information $<\pi_B(S)>_B$ based on the fourth random numbers. Thus, the elements of random numbers can be included in information that can be obtained by a third party, and hence it is possible to reduce the risk that the first secret information "a" and the second secret information "b" may leak to the third party.

Further, the first device A acquires the first public key PK1 and the first secret key SK1. The first device A transmits the first public key PK1 to the second device B. The second device B receives the first public key PK1 from the first device A. The first device A encrypts the fifth managed information $<S>_A$ based on the first public key PK1, and transmits the encrypted fifth managed information $[<S>_A]$ to the second device B. The second device B receives the encrypted fifth managed information $[<S>_A]$ from the first device A. The second device B encrypts the seventh managed information $<S>_B$ based on the first public key PK1, and acquires the encrypted third permutation result [NB(S)] based on the encrypted fifth managed information $[<S>_A]$ and the encrypted seventh managed information $[<S>_B]$. The second device B encrypts the eighth managed information $<\pi_B(S)>_B$ based on the first public key PK1, and acquires the encrypted sixth managed information $[<\pi_B(S)>_A]$ based on the encrypted third permutation result $[\pi_B(S)]$ and the encrypted eighth managed information $[<\pi_B(S)>_B]$. The second device B transmits the encrypted sixth managed information $[<\pi_B(S)>_A]$ to the first device A. The first device A receives the encrypted sixth managed information $[<\pi_B (S)>_A]$ from the second device B, decrypts the received sixth managed information $[<\pi_B(S)>_A]$ by the first secret key SK1, and acquires the decrypted sixth managed information $[<\pi_B(S)>_A]$ as the first managed information $<\pi_B(\pi_A(a)) >_A$. Thus, while information from which it is already difficult to identify the first secret information "a" and the second secret information "b" even when a third party obtains the information is exchanged, the information is also encrypted through use of the first public key PK1 and the first secret key SK1, and hence the security is further enhanced.

Further, the first device A acquires the eleventh managed information $<R>_A$ managed by the first device A from among the second distributed information R distributively managed by the first device A and the second device B. The first device A acquires the twelfth managed information $<\pi_A \, (R)>_A$ managed by the first device A from among the sixth permutation results $\pi_A \, (R)$ distributively managed by the first device A and the second device B. The first device A acquires the fifth managed information $<S>_A$ managed by the first device A from among the first distributed information S distributively managed by the first device A and the second device B. The first device A acquires, as the second managed information $<\pi_B \, (\pi_A \, (b))>_A$, the sixth managed information $<\pi_B(S)>_A$ managed by the first device A from among the third permutation results $\pi_B(S)$ distributively managed by the first device A and the second device B. The second device B acquires the thirteenth managed information $<R>_B$ managed by the second device B from among the second distributed information R. The second device B acquires the fifteenth managed information $<\pi_A \, (R)>_B$ managed by the second device B from among the sixth permutation results NA (R) as the fourteenth managed information $<\pi_A \, (b)>_B$ managed by the second device B among the seventh permutation results $\pi_A \, (b)$ distributively managed by the first device A and the second device B. The second device B acquires the seventh managed information $<S>_B$ managed by the second device B from among the first distributed information S. The second device B acquires the eighth managed information $<\pi_B(S)>3$ managed by the second device B from among the third permutation results $\pi_B(S)$. The second device B acquires the third public information $b-<R>_B$ to be disclosed to the first device A based on the second secret information "b" and the thirteenth managed information $<R>_B$. The second device B transmits the third public information $b-<R>_B$ to the first device A. The first device A receives the third public information $b-<R>_B$ from the second device B. The first device A acquires the second computation information b-R based on the eleventh managed information $<R>_A$ and the third public information $b-<R>_B$. The first device A acquires the sixteenth managed information $<\pi_A (b)>_A=\pi_A (b-R)+<\pi_A (R)>_A$ managed by the first device A from among the seventh permutation results $\pi_A$ (b) based on the twelfth managed information $<\pi_A (R)>_A$ and the eighth permutation result $\pi_A$ (b–R) obtained by permutating the second computation information b–R based on the first permutation information IA. The first device A acquires the fourth public information $<\pi_A (b)>_A-<S>_A$ to be disclosed to the second device B based on the sixteenth managed information $<\pi_A (b)>_A$ and the fifth managed information $<S>_A$. The first device A transmits the fourth public information $<\pi_A (b)>_A-<S>_A$ to the second device B. The second device B receives the fourth public information $<\pi_A (b)>_A-<S>_A$ from the first device A. The second device B acquires the third computation information $\pi_A(b)-S=<\pi_A (b)>_B-<S>_B+ (<\pi_A (b)>_A-<S>_A)$ based on the fourteenth managed information $<\pi_A (b)>3$, the seventh managed information $<S>_B$, and the fourth public information $<\pi_A (b)>_A-<S>_A$. The second device B acquires the fourth managed information $<\pi_B (\pi_A (b))>_B$ based on the eighth managed information $<\pi_B(S)>_B$ and the ninth permutation result $\pi_B (\pi_A (b)-S)$ obtained by permutating the third computation information $\pi_A$ (b)–S based on the second permutation information $\pi_B$. Thus, the second secret information "b" can be shared by the first device A and the second device B through use of the permutation based on the first permutation information $\pi_A$ and the second permutation information $\pi_B$, and hence the security is enhanced compared to the related-art method that does not use the permutation.

Further, the second device B transmits the thirteenth managed information $<R>_B$ to the first device A. The first device A receives the thirteenth managed information $<R>_B$ from the second device B. The first device A acquires the sixth permutation result IA (R) based on the eleventh managed information $<R>_A$ and the thirteenth managed information $<R>_B$. The first device A acquires the fifteenth managed information $<\pi_A (R)>_B$ based on the sixth permutation result $\pi_A$ (R) and the twelfth managed information $<\pi_A (R)>_A$. The first device A transmits the fifteenth managed information $<\pi_A (R)>_B$ to the second device B. The second device B receives the fifteenth managed information $<\pi_A (R)>_B$ from the first device A, and acquires the received fifteenth managed information $<\pi_A (R)>_B$ as the fourteenth managed information $<\pi_A (b)>_B$. Thus, even when a third party acquires the thirteenth managed information $<R>_B$ and fifteenth managed information $<\pi_A (R)>_B$ that are being transmitted over the network N, the first secret information "a" and the second secret information "b" cannot be identified only with the acquired information, and hence it is possible to reduce the risk that the first secret information "a" and the second secret information "b" may leak to the third party.

Further, the first device A acquires the eleventh managed information $<R>_A$ based on fifth random numbers. The first device A acquires the twelfth managed information $<\pi_A (R)>_A$ based on the sixth random numbers. The second device B acquires the thirteenth managed information $<R>_B$ based on the seventh random numbers. Thus, the elements of random numbers can be included in information that can be obtained by a third party, and hence it is possible to reduce the risk that the first secret information "a" and the second secret information "b" may leak to the third party.

Further, the second device B acquires the second public key PK2 and the second secret key SK2. The second device B transmits the second public key PK2 to the first device A. The first device A receives the second public key PK2 from the second device B. The second device B encrypts the thirteenth managed information $<R>_B$ based on the second public key PK2, and transmits the encrypted thirteenth managed information $[<R>_B]$ to the first device A. The first device A receives the encrypted thirteenth managed information $[<R>_B]$ from the second device B. The first device A encrypts the eleventh managed information $<R>_A$ based on the second public key PK2, and acquires the encrypted sixth permutation result $[IA (R)]$ based on the encrypted thirteenth managed information $[<R>_B]$ and the encrypted eleventh managed information $[<R>_A]$. The first device A encrypts the twelfth managed information $<\pi_A (R)>_A$ based on the second public key PK2, and acquires the encrypted fifteenth managed information $[<\pi_A (R)>_B]$ based on the encrypted sixth permutation result $[\pi_A (R)]$ and the encrypted twelfth managed information $[<\pi_A (R)>_A]$. The first device A transmits the encrypted fifteenth managed information $[<\pi_A (R)>_B]$ to the second device B. The fourteenth managed information acquisition module B117 of the second device B receives the encrypted fifteenth managed information $[<\pi_A (R)>_B]$ from the first device A, decrypts the received fifteenth managed information $[<\pi_A (R)>_B]$ by the second secret key SK2, and acquires the decrypted fifteenth managed information $[<\pi_A (R)>_B]$ as the fourteenth managed information $<\pi_A(b)>_B$. Thus, while information from which it is already difficult to identify the first secret information "a" and the second secret information "b" even when a third party obtains the information is exchanged, the information is also encrypted through use of the second public key PK2 and the second secret key SK2, and hence the security is further enhanced.

Further, the first device A acquires the first managed products $<e_i>_A$ managed by the first device A based on the first managed information $<c>_A$ and the second managed information $<d>_A$ from among the distributed products $e_i$ being products of the first permutation results $\pi_B (\pi_A (a))$ and the second permutation results $\pi_B (\pi_A (b))$ and distributively managed by the first device A and the second device B. The first device A acquires the first sum $\Sigma_i<e_i>_A$ being the sum of the first managed products $<e_i>_A$. The second device B acquires the second managed products $<e_i>_B$ managed by the second device B from among the distributed products $e_i$ based on the third managed information $<c>_B$ and the fourth managed information $<d>_B$. The second device B acquires the second sum $\Sigma_i<e_i>_B$ being the sum of the elements of the second managed products $<e_i>_B$. The secret product $\Sigma_i a_i b_i$ is computed based on the first sum $\Sigma_i<e_i>_A$ and the second sum $\Sigma_i<e_i>_B$. Even when a third party acquires information being transmitted between the first device A and the second device B, the first secret information "a" and the second secret information "b" cannot be identified, and hence it is possible to reduce the risk that the first secret information "a" and the second secret information "b" may leak to the third party.

Further, the first device A acquires the first managed products $<e_i>_A$ based on the method of the Beaver multiplication triples (BMT). The second device B acquires the second managed products $<e_i>$: based on the method of the BMT. Thus, the method of the secure computation is used for the first managed products $<e_i>_A$ and the second managed products $<e_i>_B$ as well, and hence the security is further enhanced.

Further, the second device B transmits the second sum $\Sigma_i<e_i>_B$ to the first device A. The first device A receives the second sum $\Sigma_i<e_i>_B$ from the second device B. The first device A computes the secret product $\Sigma_i a_i b_i$ based on the first sum $\Sigma_i<e_i>_A$ and the second sum $\Sigma_i<e_i>_B$. Thus, even when a third party obtains information required for the computation of the secret product $\Sigma_i a_i b_i$, the first secret information "a" and the second secret information "b" cannot be identified only with the acquired information, and hence it is possible to reduce the risk that the first secret information "a" and the second secret information "b" may leak to the third party.

Further, the first secret information "a", the second secret information "b", the first permutation results $\pi_B$ ($\pi_A$ (a)), the first managed information $<c>_A$, the second permutation results $\pi_B$ ($\pi_A$ (b)), the second managed information $<d>_A$, the third managed information $<c>3$, and the fourth managed information $<d>_B$ each have a vector format. The first permutation information IA and the second permutation information $\pi_B$ each have an array format. The secret product $\Sigma_i a_i b_i$ is an inner product. This enables the computing system 10 to compute the inner product of the vectors without transmitting the vectors to be kept secret between the first device A and the second device B.

Further, in the computing system 10, the training of the learning model in the federated learning is executed based on the secret product $\Sigma_i a_i b_i$. Thus, security during the training in the federated learning is enhanced.

Further, the first secret information is information relating to each of the plurality of users in the first service. The second secret information is information relating to each of the plurality of users in the second service. In the computing system 10, it is possible to compute the product while securely managing the information relating to the users, and hence it is possible to reduce the risk that the information relating to the users may leak.

5. Modification Example

The present disclosure is not limited to the at least one embodiment described above. Modifications can be made as appropriate without departing from the gist of the present disclosure. For example, the computing system 10 can be applied to another situation different from the federated learning. The computing system 10 can be applied to a situation in which the product of a plurality of pieces of secret information is computed for some purpose.

For example, it suffices that the functions described as being implemented by the first device A or the second device B are implemented by at least one computer in the computing system 10, and the functions may be shared by a plurality of computers. In this case, the sharing of each function may be achieved by each of the plurality of computers transmitting its own processing result to another computer.

6. Supplementary Notes

For example, the computing system may have configurations as described below.

(1)

A computing system, including:

a first device configured to securely manage first secret information having the number of elements equal to or larger than two and first permutation information for permutating elements having the number of elements; and a second device configured to securely manage second secret information having the number of elements and second permutation information for permutating elements having the number of elements, wherein the first device includes:

a first managed information acquisition module configured to acquire first managed information managed by the first device from among first permutation results obtained as a result of permutating the first secret information based on the first permutation information and the second permutation information and distributively managed by the first device and the second device; and a second managed information acquisition module configured to acquire second managed information managed by the first device from among second permutation results obtained as a result of permutating the second secret information based on the first permutation information and the second permutation information and distributively managed by the first device and the second device, wherein the second device includes:

a third managed information acquisition module configured to acquire third managed information managed by the second device from among the first permutation results; and a fourth managed information acquisition module configured to acquire fourth managed information managed by the second device from among the second permutation results, and wherein the first managed information, the second managed information, the third managed information, and the fourth managed information are used to compute a secret product being a product of the first secret information and the second secret information.

(2)

The computing system according to Item (1), wherein the first device further includes a fifth managed information acquisition module configured to acquire fifth managed information managed by the first device from among first distributed information distributively managed by the first device and the second device, wherein the first managed information acquisition module of the first device is configured to acquire, as the first managed information, sixth managed information managed by the first device from among third permutation results obtained as a result of permutating the first distributed information based on the second permutation information and distributively managed by the first device and the second device, wherein the second device further includes:

a seventh managed information acquisition module configured to acquire seventh managed information managed by the second device from among the first distributed information;

an eighth managed information acquisition module configured to acquire eighth managed information managed by the second device from among the third permutation results;

a first public information acquisition module configured to acquire first public information to be disclosed to the first device as ninth managed information managed by the second device among fourth permutation results obtained as a result of permutating the first secret information based on the first permutation information and distributively managed by the first device and the second device; and a first public information transmission module configured to transmit the first public information to the first device, wherein the first device further includes:

a first public information reception module configured to receive the first public information from the second device;

a tenth managed information acquisition module configured to acquire tenth managed information managed by the first device from among the fourth permutation results based on the first public information;

a second public information acquisition module configured to acquire second public information to be disclosed to the second device based on the tenth managed information and the fifth managed information; and a second public information transmission module configured to transmit the second public information to the second device, wherein the second device further includes:

a second public information reception module configured to receive the second public information from the first device; and a first computation information acquisition module configured to acquire first computation information based on the eighth managed information, the ninth managed information, and the second public information, and wherein the third managed information acquisition module of the second device is configured to acquire the third managed information based on the eighth managed information and fifth permutation results obtained by permutating the first computation information based the second permutation information.

(3)

The computing system according to Item (2), wherein the first public information acquisition module of the second device is configured to acquire the first public information based on first random numbers.

(4)

The computing system according to Item (2) or (3), wherein the first device includes a fifth managed information transmission module configured to transmit the fifth managed information to the second device, wherein the second device further includes:

a fifth managed information reception module configured to receive the fifth managed information from the first device;

a third permutation result acquisition module configured to acquire one of the third permutation results based on the fifth managed information and the seventh managed information;

a sixth managed information acquisition module configured to acquire the sixth managed information based on the one of the third permutation results and the eighth managed information; and a sixth managed information transmission module configured to transmit the sixth managed information to the first device, and wherein the first managed information acquisition module of the first device is configured to receive the sixth managed information from the second device, and acquire the received sixth managed information as the first managed information.

(5)

The computing system according to Item (4), wherein the fifth managed information acquisition module of the first device is configured to acquire the fifth managed information based on second random numbers, wherein the seventh managed information acquisition module of the second device is configured to acquire the seventh managed information based on third random numbers, and wherein the eighth managed information acquisition module of the second device is configured to acquire the eighth managed information based on fourth random numbers.

(6)

The computing system according to Item (4) or (5), wherein the first device further includes:

a first key acquisition module configured to acquire a first public key and a first secret key; and a first public key transmission module configured to transmit the first public key to the second device, wherein the second device further includes a first public key reception module configured to receive the first public key from the first device, wherein the fifth managed information transmission module of the first device is configured to encrypt the fifth managed information based on the first public key, and transmit the encrypted fifth managed information to the second device, wherein the fifth managed information reception module of the second device is configured to receive the encrypted fifth managed information from the first device, wherein the third permutation result acquisition module of the second device is configured to encrypt the seventh managed information based on the first public key, and acquire the encrypted one of the third permutation results based on the encrypted fifth managed information and the encrypted seventh managed information, wherein the sixth managed information acquisition module of the second device is configured to encrypt the eighth managed information based on the first public key, and acquire the encrypted sixth managed information based on the encrypted one of the third permutation results and the encrypted eighth managed information, wherein the sixth managed information transmission module of the second device is configured to transmit the encrypted sixth managed information to the first device, and wherein the first managed information acquisition module of the first device is configured to receive the encrypted sixth managed information from the second device, decrypt the received sixth managed information by the first secret key, and acquire the decrypted sixth managed information as the first managed information.

(7)

The computing system according to any one of Items (1) to (6), wherein the first device further includes:

an eleventh managed information acquisition module configured to acquire eleventh managed information managed by the first device from among second distributed information distributively managed by the first device and the second device;

a twelfth managed information acquisition module configured to acquire twelfth managed information managed by the first device from among sixth permutation results obtained as a result of permutating the second distributed information based on the first permutation information and distributively managed by the first device and the second device; and a fifth managed information acquisition module configured to acquire fifth managed information managed by the first device from among first distributed information distributively managed by the first device and the second device, wherein the second managed information acquisition module of the first device is configured to acquire, as the second managed information, sixth managed information managed by the first device from among third permutation results obtained as a result of permutating the first distributed information based on the second permutation information and distributively managed by the first device and the second device, wherein the second device further includes:

a thirteenth managed information acquisition module configured to acquire thirteenth managed information managed by the second device from among the second distributed information;

a fourteenth managed information acquisition module configured to acquire fifteenth managed information managed by the second device from among the sixth permutation results as fourteenth managed information managed by the second device among seventh permutation results obtained as a result of permutating the second secret information based on the first permutation information and distributively managed by the first device and the second device;

a seventh managed information acquisition module configured to acquire seventh managed information managed by the second device from among the first distributed information;

an eighth managed information acquisition module configured to acquire eighth managed information managed by the second device from among the third permutation results;

a third public information acquisition module configured to acquire third public information to be disclosed to the first device based on the second secret information and the thirteenth managed information; and a third public information transmission module configured to transmit the third public information to the first device, wherein the first device further includes:

a third public information reception module configured to receive the third public information from the second device;

a second computation information acquisition module configured to acquire second computation information based on the eleventh managed information and the third public information;

a sixteenth managed information acquisition module configured to acquire sixteenth managed information managed by the first device from among the seventh permutation results based on the twelfth managed information and an eighth permutation result obtained by permutating the second computation information based on the first permutation information;

a fourth public information acquisition module configured to acquire fourth public information to be disclosed to the second device based on the sixteenth managed information and the fifth managed information; and a fourth public information transmission module configured to transmit the fourth public information to the second device, wherein the second device further includes:

a fourth public information reception module configured to receive the fourth public information from the first device; and a third computation information acquisition module configured to acquire third computation information based on the fourteenth managed information, the seventh managed information, and the fourth public information, and wherein the fourth managed information acquisition module of the second device is configured to acquire the fourth managed information based on the eighth managed information and a ninth permutation result obtained by permutating the third computation information based on the second permutation information.

(8)

The computing system according to Item (7), wherein the second device includes a thirteenth managed information transmission module configured to transmit the thirteenth managed information to the first device, wherein the first device further includes:

a thirteenth managed information reception module configured to receive the thirteenth managed information from the second device;

a sixth permutation result acquisition module configured to acquire one of the sixth permutation results based on the eleventh managed information and the thirteenth managed information;

a fifteenth managed information acquisition module configured to acquire the fifteenth managed information based on the one of the sixth permutation results and the twelfth managed information; and a fifteenth managed information transmission module configured to transmit the fifteenth managed information to the second device, and wherein the fourteenth managed information acquisition module of the second device is configured to receive the fifteenth managed information from the first device, and acquire the received fifteenth managed information as the fourteenth managed information.

(9)

The computing system according to Item (8), wherein the eleventh managed information acquisition module of the first device is configured to acquire the eleventh managed information based on fifth random numbers, wherein the twelfth managed information acquisition module of the first device is configured to acquire the twelfth managed information based on sixth random numbers, and wherein the thirteenth managed information acquisition module of the second device is configured to acquire the thirteenth managed information based on seventh random numbers.

(10)

The computing system according to Item (8) or (9), wherein the second device further includes:

a second key acquisition module configured to acquire a second public key and a second secret key; and a second public key transmission module configured to transmit the second public key to the first device, wherein the first device further includes a second public key reception module configured to receive the second public key from the second device, wherein the thirteenth managed information transmission module of the second device is configured to encrypt the thirteenth managed information based on the second public key, and transmit the encrypted thirteenth managed information to the first device, wherein the thirteenth managed information reception module of the first device is configured to receive the encrypted thirteenth managed information from the second device, wherein the sixth permutation result acquisition module of the first device is configured to encrypt the eleventh managed information based on the second public key, and acquire the encrypted one of the sixth permutation results based on the encrypted thirteenth managed information and the encrypted eleventh managed information, wherein the fifteenth managed information acquisition module of the first device is configured to encrypt the twelfth managed information based on the second public key, and acquire the encrypted fifteenth managed information based on the encrypted one of the sixth permutation results and the encrypted twelfth managed information, wherein the fifteenth managed information transmission module of the first device is configured to transmit the encrypted fifteenth managed information to the second device, and wherein the fifteenth managed information acquisition module of the second device is configured to receive the encrypted fifteenth managed information from the first device, decrypt the received fifteenth managed information by the second secret key, and acquire the decrypted fifteenth managed information as the fourteenth managed information.

(11)

The computing system according to any one of Items (7) to (10), wherein the fifth managed information acquisition module of the first device is configured to acquire the fifth managed information based on second random numbers, wherein the seventh managed information acquisition module of the second device is configured to acquire the seventh managed information based on third random numbers, and wherein the eighth managed information acquisition module of the second device is configured to acquire the eighth managed information based on fourth random numbers.

(12)

The computing system according to any one of claims (7) to (11), wherein the first device further includes:

a first key acquisition module configured to generate a first public key and a first secret key; and a first public key transmission module configured to transmit the first public key to the second device, wherein the second device further includes a first public key reception module configured to receive the first public key from the first device, wherein the fifth managed information transmission module of the first device is configured to encrypt the fifth managed information based on the first public key, and transmit the encrypted fifth managed information to the second device, wherein the fifth managed information reception module of the second device is configured to receive the encrypted fifth managed information from the first device, wherein the third permutation result acquisition module of the second device is configured to encrypt the seventh managed information based on the first public key, and acquire an encrypted one of the third permutation results based on the encrypted fifth managed information and the encrypted seventh managed information, wherein the sixth managed information acquisition module of the second device is configured to encrypt the eighth managed information based on the first public key, and acquire the encrypted sixth managed information based on the encrypted one of the third permutation results and the encrypted eighth managed information, wherein the sixth managed information transmission module of the second device is configured to transmit the encrypted sixth managed information to the first device, and wherein the first managed information acquisition module of the first device is configured to receive the encrypted sixth managed information from the second device and decrypt the received sixth managed information by the first secret key.

(13)

The computing system according to any one of Items (1) to (12), wherein the first device further includes:

a first managed product acquisition module configured to acquire first managed products managed by the first device based on the first managed information and the second managed information from among distributed products being products of the first permutation results and the second permutation results and distributively managed by the first device and the second device; and a first sum acquisition module configured to acquire a first sum being a sum of the first managed products, wherein the second device further includes:

a second managed product acquisition module configured to acquire second managed products managed by the second device from among the distributed products based on the third managed information and the fourth managed information; and a second sum acquisition module configured to acquire a second sum being a sum of elements of the second managed products, and wherein the first sum and the second sum are used to compute the secret product.

(14)

The computing system according to Item (13), wherein the first managed product acquisition module of the first device is configured to acquire the first managed products based on a method of Beaver multiplication triples (BMT), and wherein the second managed product acquisition module of the second device is configured to acquire the second managed products based on the method of the BMT.

(15)

The computing system according to Item (13) or (14), wherein the second device further includes a second sum transmission module configured to transmit the second sum to the first device, and wherein the first device further includes:

a second sum reception module configured to receive the second sum from the second device; and a secret product computing module configured to compute the secret product based on the first sum and the second sum.

(16)

The computing system according to any one of Items (1) to (15), wherein the first secret information, the second secret information, the first permutation results, the first managed information, the second permutation results, the second managed information, the third managed information, and the fourth managed information each have a vector format, wherein the first permutation information and the second permutation information each have an array format, and wherein the secret product is an inner product.

(17)

The computing system according to any one of Items (1) to (16), wherein the computing system is configured to execute training of a learning model in federated learning based on the secret product.

(18)

The computing system according to any one of Items (1) to (17), wherein the first secret information is information relating to each of a plurality of users in a first service, and wherein the second secret information is information relating to each of the plurality of users in a second service.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A computing system, comprising:

a first device configured to securely manage first secret information having the number of elements equal to or larger than two and first permutation information for permutating elements having the number of elements; and a second device configured to securely manage second secret information having the number of elements and second permutation information for permutating elements having the number of elements, wherein the first device is configured to:

acquire first managed information managed by the first device from among first permutation results obtained as a result of permutating the first secret information based on the first permutation information and the second permutation information and distributively managed by the first device and the second device; and acquire second managed information managed by the first device from among second permutation results obtained as a result of permutating the second secret information based on the first permutation information and the second permutation information and distributively managed by the first device and the second device, wherein the second device is configured to:

acquire third managed information managed by the second device from among the first permutation results; and acquire fourth managed information managed by the second device from among the second permutation results, and wherein the first managed information, the second managed information, the third managed information, and the fourth managed information are used to compute a secret product being a product of the first secret information and the second secret information;

wherein the first device is configured to:

acquire fifth managed information managed by the first device from among first distributed information distributively managed by the first device and the second device; and acquire, as the first managed information, sixth managed information managed by the first device from among third permutation results obtained as a result of permutating the first distributed information based on the second permutation information and distributively managed by the first device and the second device, wherein the second device is configured to:

acquire seventh managed information managed by the second device from among the first distributed information;

acquire eighth managed information managed by the second device from among the third permutation results;

acquire first public information to be disclosed to the first device as ninth managed information managed by the second device among fourth permutation results obtained as a result of permutating the first secret information based on the first permutation information and distributively managed by the first device and the second device; and transmit the first public information to the first device, wherein the first device is configured to:

receive the first public information from the second device;

acquire tenth managed information managed by the first device from among the fourth permutation results based on the first public information;

acquire second public information to be disclosed to the second device based on the tenth managed information and the fifth managed information; and transmit the second public information to the second device, and wherein the second device is configured to:

receive the second public information from the first device;

acquire first computation information based on the eighth managed information, the ninth managed information, and the second public information; and acquire the third managed information based on the eighth managed information and fifth permutation results obtained by permutating the first computation information based on the second permutation information;

wherein the computing system is configured to execute training of a learning model in federated learning based on the secret product.

2. The computing system according to claim 1, wherein the second device is configured to acquire the first public information based on first random numbers.

3. The computing system according to claim 1,
wherein the first device is configured to transmit the fifth managed information to the second device,
wherein the second device is configured to:
    receive the fifth managed information from the first device;
    acquire one of the third permutation results based on the fifth managed information and the seventh managed information;
    acquire the sixth managed information based on the one of the third permutation results and the eighth managed information; and
    transmit the sixth managed information to the first device, and
wherein the first device is configured to receive the sixth managed information from the second device, and acquire the received sixth managed information as the first managed information.

4. The computing system according to claim 3,
wherein the first device is configured to acquire the fifth managed information based on second random numbers, and
wherein the second device is configured to:
    acquire the seventh managed information based on third random numbers; and
    acquire the eighth managed information based on fourth random numbers.

5. The computing system according to claim 3,
wherein the first device is configured to:
    acquire a first public key and a first secret key; and
    transmit the first public key to the second device,
wherein the second device is configured to receive the first public key from the first device,
wherein the first device is configured to encrypt the fifth managed information based on the first public key, and transmit the encrypted fifth managed information to the second device,
wherein the second device is configured to:
    receive the encrypted fifth managed information from the first device;
    encrypt the seventh managed information based on the first public key, and acquire the encrypted one of the third permutation results based on the encrypted fifth managed information and the encrypted seventh managed information;
    encrypt the eighth managed information based on the first public key, and acquire the encrypted sixth managed information based on the encrypted one of the third permutation results and the encrypted eighth managed information; and
    transmit the encrypted sixth managed information to the first device, and
wherein the first device is configured to receive the encrypted sixth managed information from the second device, decrypt the received sixth managed information by the first secret key, and acquire the decrypted sixth managed information as the first managed information.

6. The computing system according to claim 1,
wherein the first device is configured to:
    acquire first managed products managed by the first device based on the first managed information and the second managed information from among distributed products being products of the first permutation results and the second permutation results and distributively managed by the first device and the second device; and
    acquire a first sum being a sum of the first managed products,
wherein the second device is configured to:
    acquire second managed products managed by the second device from among the distributed products based on the third managed information and the fourth managed information; and
    acquire a second sum being a sum of elements of the second managed products, and
wherein the first sum and the second sum are used to compute the secret product.

7. The computing system according to claim 6,
wherein the first device is configured to acquire the first managed products based on a method of Beaver multiplication triples (BMT), and
wherein the second device is configured to acquire the second managed products based on the method of the BMT.

8. The computing system according to claim 6,
wherein the second device is configured to transmit the second sum to the first device, and
wherein the first device is configured to:
    receive the second sum from the second device; and
    compute the secret product based on the first sum and the second sum.

9. The computing system according to claim 1,
wherein the first secret information, the second secret information, the first permutation results, the first managed information, the second permutation results, the second managed information, the third managed information, and the fourth managed information each have a vector format,
wherein the first permutation information and the second permutation information each have an array format, and
wherein the secret product comprises an inner product.

10. The computing system according to claim 1,
wherein the first secret information comprises information relating to each of a plurality of users in a first service, and
wherein the second secret information comprises information relating to each of the plurality of users in a second service.

11. The computing system according to claim 10,
wherein the first device comprises a first learning model to estimate a characteristic of a user of the first service; and
wherein the second device comprises a second learning model to estimate the characteristic of a user of the second service.

12. The computing system according to claim 11,
wherein the first device is configured to generate the first secret information based on a part of the parameters of the first learning model and an estimation result of the first learning model.

13. The computing system according to claim 10;
wherein computing system is configured to transmit a learning result based on the executed training of the learning model to the first device and the second device;
wherein the first device is configured to update the first learning model based on the learning result; and
wherein the second device is configured to update the second learning model based on the learning result.

14. A computing system, comprising:

a first device configured to securely manage first secret information having the number of elements equal to or larger than two and first permutation information for permutating elements having the number of elements; and a second device configured to securely manage second secret information having the number of elements and second permutation information for permutating elements having the number of elements, wherein the first device is configured to:

acquire first managed information managed by the first device from among first permutation results obtained as a result of permutating the first secret information based on the first permutation information and the second permutation information and distributively managed by the first device and the second device; and acquire second managed information managed by the first device from among second permutation results obtained as a result of permutating the second secret information based on the first permutation information and the second permutation information and distributively managed by the first device and the second device, wherein the second device is configured to:

acquire third managed information managed by the second device from among the first permutation results; and acquire fourth managed information managed by the second device from among the second permutation results, and wherein the first managed information, the second managed information, the third managed information, and the fourth managed information are used to compute a secret product being a product of the first secret information and the second secret information;

wherein the first device is configured to:

acquire eleventh managed information managed by the first device from among second distributed information distributively managed by the first device and the second device;

acquire twelfth managed information managed by the first device from among sixth permutation results obtained as a result of permutating the second distributed information based on the first permutation information and distributively managed by the first device and the second device;

acquire fifth managed information managed by the first device from among first distributed information distributively managed by the first device and the second device; and acquire, as the second managed information, sixth managed information managed by the first device from among third permutation results obtained as a result of permutating the first distributed information based on the second permutation information and distributively managed by the first device and the second device, wherein the second device is configured to:

acquire thirteenth managed information managed by the second device from among the second distributed information;

acquire fifteenth managed information managed by the second device from among the sixth permutation results as fourteenth managed information managed by the second device among seventh permutation results obtained as a result of permutating the second secret information based on the first permutation information and distributively managed by the first device and the second device;

acquire seventh managed information managed by the second device from among the first distributed information;

acquire eighth managed information managed by the second device from among the third permutation results;

acquire third public information to be disclosed to the first device based on the second secret information and the thirteenth managed information; and transmit the third public information to the first device, wherein the first device is configured to:

receive the third public information from the second device;

acquire second computation information based on the eleventh managed information and the third public information;

acquire sixteenth managed information managed by the first device from among the seventh permutation results based on the twelfth managed information and an eighth permutation result obtained by permutating the second computation information based on the first permutation information;

acquire fourth public information to be disclosed to the second device based on the sixteenth managed information and the fifth managed information; and transmit the fourth public information to the second device, and wherein the second device is configured to:

receive the fourth public information from the first device;

acquire third computation information based on the fourteenth managed information, the seventh managed information, and the fourth public information; and acquire the fourth managed information based on the eighth managed information and a ninth permutation result obtained by permutating the third computation information based on the second permutation information;

wherein the computing system is configured to execute training of a learning model in federated learning based on the secret product.

15. The computing system according to claim 14, wherein the second device is configured to transmit the thirteenth managed information to the first device, wherein the first device is configured to:

receive the thirteenth managed information from the second device;

acquire one of the sixth permutation results based on the eleventh managed information and the thirteenth managed information;

acquire the fifteenth managed information based on the one of the sixth permutation results and the twelfth managed information; and transmit the fifteenth managed information to the second device, and wherein the second device is configured to receive the fifteenth managed information from the first device, and acquire the received fifteenth managed information as the fourteenth managed information.

16. The computing system according to claim 15,
wherein the first device is configured to:

acquire the eleventh managed information based on fifth random numbers; and acquire the twelfth managed information based on sixth random numbers, and wherein the second device is configured to acquire the thirteenth managed information based on seventh random numbers.

17. The computing system according to claim 15,
wherein the second device is configured to:

acquire a second public key and a second secret key; and transmit the second public key to the first device, wherein the first device is configured to receive the second public key from the second device, wherein the second device is configured to encrypt the thirteenth managed information based on the second public key, and transmit the encrypted thirteenth managed information to the first device, wherein the first device is configured to receive the encrypted thirteenth managed information from the second device, wherein the first device is configured to:

encrypt the eleventh managed information based on the second public key, and acquire the encrypted one of the sixth permutation results based on the encrypted thirteenth managed information and the encrypted eleventh managed information;

encrypt the twelfth managed information based on the second public key, and acquire the encrypted fifteenth managed information based on the encrypted one of the sixth permutation results and the encrypted twelfth managed information; and transmit the encrypted fifteenth managed information to the second device, and wherein the second device is configured to receive the encrypted fifteenth managed information from the first device, decrypt the received fifteenth managed information by the second secret key, and acquire the decrypted fifteenth managed information as the fourteenth managed information.

18. The computing system according to claim 14,
wherein the first device is configured to acquire the fifth managed information based on second random numbers, and wherein the second device is configured to:

acquire the seventh managed information based on third random numbers; and acquire the eighth managed information based on fourth random numbers.

19. The computing system according to claim 14,
wherein the first device is configured to:

generate a first public key and a first secret key; and transmit the first public key to the second device, wherein the second device is configured to receive the first public key from the first device, wherein the first device is configured to encrypt the fifth managed information based on the first public key, and transmit the encrypted fifth managed information to the second device, wherein the second device is configured to:

receive the encrypted fifth managed information from the first device;

encrypt the seventh managed information based on the first public key, and acquire an encrypted one of the third permutation results based on the encrypted fifth managed information and the encrypted seventh managed information;

encrypt the eighth managed information based on the first public key, and acquire the encrypted sixth managed information based on the encrypted one of the third permutation results and the encrypted eighth managed information; and transmit the encrypted sixth managed information to the first device, and wherein the first device is configured to receive the encrypted sixth managed information from the second device and decrypt the received sixth managed information by the first secret key.

20. A computing method, which is executed by: a first device configured to securely manage first secret information having the number of elements equal to or larger than two and first permutation information for permutating elements having the number of elements; and a second device configured to securely manage second secret information having the number of elements and second permutation information for permutating elements having the number of elements, the computing method comprising:

acquiring, by the first device, first managed information managed by the first device from among first permutation results obtained as a result of permutating the first secret information based on the first permutation information and the second permutation information and distributively managed by the first device and the second device;

acquiring, by the first device, second managed information managed by the first device from among second permutation results obtained as a result of permutating the second secret information based on the first permutation information and the second permutation information and distributively managed by the first device and the second device;

acquiring, by the second device, third managed information managed by the second device from among the first permutation results;

acquiring, by the second device, fourth managed information managed by the second device from among the second permutation results; and computing, based on the first managed information, the second managed information, the third managed information, and the fourth managed information, a secret product being a product of the first secret information and the second secret information;

acquiring, by the first device, fifth managed information managed by the first device from among first distributed information distributively managed by the first device and the second device; and acquiring, by the first device, as the first managed information, sixth managed information managed by the first device from among third permutation results obtained as a result of permutating the first distributed information based on the second permutation information and distributively managed by the first device and the second device, acquiring, by the second device, seventh managed information managed by the second device from among the first distributed information;

acquiring, by the second device, eighth managed information managed by the second device from among the third permutation results;

acquiring, by the second device, first public information to be disclosed to the first device as ninth managed information managed by the second device among fourth permutation results obtained as a result of permutating the first secret information based on the first permutation information and distributively managed by the first device and the second device; and transmitting, by the second device, the first public information to the first device, receiving, by the first device, the first public information from the second device;

acquiring, by the first device, tenth managed information managed by the first device from among the fourth permutation results based on the first public information;

acquiring, by the first device, second public information to be disclosed to the second device based on the tenth managed information and the fifth managed information; and transmitting, by the first device, the second public information to the second device, and receiving, by the second device, the second public information from the first device;

acquiring, by the second device, first computation information based on the eighth managed information, the ninth managed information, and the second public information; and acquiring, by the second device, the third managed information based on the eighth managed information and fifth permutation results obtained by permutating the first computation information based on the second permutation information;

executing training of a learning model in federated learning based on the secret product.

* * * * *